(12) United States Patent
Susaki

(10) Patent No.: US 7,453,055 B2
(45) Date of Patent: Nov. 18, 2008

(54) IMAGE READING APPARATUS

(75) Inventor: Yoichi Susaki, Nagoya (JP)

(73) Assignee: Brother Kogyo Kabushiki Kaisha, Nagoya-shi, Aichi-ken ( * ) Notice: Subject to any disclaimer, the term of this patent is extended or adjusted under 35 U.S.C. 154(b) by 125 days.

(21) Appl. No.: 11/380,604

(22) Filed: Apr. 27, 2006

(65) Prior Publication Data
US 2006/0250661 A1    Nov. 9, 2006

(30) Foreign Application Priority Data

Apr. 28, 2005 (JP) .............................. 2005-130898
Apr. 28, 2005 (JP) .............................. 2005-132722

(51) Int. Cl.
- H01L 27/00 (2006.01)
- H01J 3/14 (2006.01)
- H04N 1/40 (2006.01)
- H04N 1/04 (2006.01)
- G06K 7/00 (2006.01)

(52) U.S. Cl. .................... 250/208.1; 250/216; 358/461; 358/494; 382/312

(58) Field of Classification Search .............. 250/208.1, 250/216; 358/474, 475, 461, 493, 494; 382/312, 382/315; 340/686, 689
See application file for complete search history.

(56) References Cited

U.S. PATENT DOCUMENTS 4,540,269 A * 9/1985 Nishiyama .................. 340/689
5,682,252 A   10/1997 Ando
6,697,600 B2 * 2/2004 Nishikino et al. ........... 399/380
6,892,945 B2   5/2005 Shishido

FOREIGN PATENT DOCUMENTS

| JP | 198863136462 U | 9/1988 |
| JP | 1996328447 A | 12/1996 |
| JP | 2002185796 A | 6/2002 |
| JP | 2003134307 A | 5/2003 |
| JP | 2004333676 A | 11/2004 |

* cited by examiner

Primary Examiner—Georgia Y. Epps
Assistant Examiner—Don Williams
(74) Attorney, Agent, or Firm—Baker Botts L.L.P.

(57) ABSTRACT

An image reading apparatus includes a document placing table having a transparent member, a document pressing member, an image reading unit, a scanning unit that is disposed on a side opposite to a document placing surface of the transparent member and reciprocates in a predetermined direction along the transparent member with the image reading unit mounted thereon, an open/closed state detecting unit that detects open and closed states of the document pressing member, a control unit that controls an image reading operation of the image reading unit and a reciprocation movement of the scanning unit, and a reference member that serves as a luminance reference of the image reading unit. When the open/closed state detecting unit detects the open state of the document pressing member, the control unit set a predetermined light intensity set value to a light intensity value of light irradiated from the light source at the time of image reading.

27 Claims, 16 Drawing Sheets

IMAGE READING APPARATUS

CROSS REFERENCE TO RELATED APPLICATION

This application claims priority from Japanese Patent Applications No. 2005-130898, filed on Apr. 28, 2005 and No. 2005-132722, filed on Apr. 28, 2005, the entire subject matter of which is incorporated herein by reference.

TECHNICAL FIELD

Aspects of the present invention relate to an image reading apparatus which irradiates light onto a document through a transparent member of a document placing table so as to read an image. In particular, aspects of the invention relate to an image reading apparatus which adjusts a light intensity to be irradiated from a light source, with respect to a reference member Also, aspects of the invention relate to an image reading apparatus which performs an output adjustment of an image reading unit with respect to a reference member.

BACKGROUND

There is conventionally known an image reading apparatus which is mounted on a copy machine, a scanner, and a multi function device that includes the functions of the copy machine and the scanner. Such an image reading apparatus includes a flatbed scanner and an apparatus that includes an automatic document conveying mechanism called an ADF (Auto Document Feeder) in which a CCD (Charge Coupled Device) or a CIS (Contact Image Sensor) is disposed and which conveys a document from a paper supply tray to a paper discharge tray through a conveying path, and reads an image of the document to be conveyed.

For example, in a conventional image reading apparatus 90 shown in FIG. 16, a document pressing cover 91 is provided with an ADF 92. A document of a paper supply tray is conveyed to an ADF reading region 93A of a platen glass 93 by the ADF 92. Then, by an image scanner (not shown) disposed in a document placing table 94, the image of the document traveling through the ADF reading region 93A can be read. Further, the image reading apparatus 90 can be used as a flatbed scanner. In this case, the document placed on a still document reading region 93B of the platen glass 93 is covered with the document pressing cover 91 to be then pressed and fixed. Then, the image of the document can be read by the image scanner disposed in the document placing table 94.

In a CCD or CIS used as an image sensor, light is emitted from a light source toward the platen glass 93, transmits the platen glass 93, and is reflected from the surface of the document. And then, reflected light is converted into an electrical signal by a light-receiving element, and thus the image of the document is optically read. The light source or the light-receiving element of the image sensor has a variation in light intensity, light distribution irregularity, or sensitivity irregularity. For this reason, so-called shading correction is performed. In the shading correction, after the light intensity of the light source for a white reference member is adjusted, the reference member is read so as to acquire white level data and black level data, and reading data is corrected on the basis of white level data and black level data. For example, in the image reading apparatus 90, a reference member is disposed at the back of a dividing member 95 which divides the platen glass 93 into the ADF reading region 93A and the still document reading region 93B. According to this configuration, prior to image reading of the document, the light intensity adjustment about the reference member is performed and reference data is acquired.

In recent years, with the enhancement of sensitivity of the image sensor, a light source having low illuminance becomes usable. For example, in the CIS, an LED (Light Emitting Diode) light source or an LIDE light source using an LED and a linear light guide is adopted. Due to low illuminance of the light source, there is a condition in that an influence of external light on the reference member is increased. External light is indoor or outdoor light entering from the ADF reading region 93A or the like into the document placing table 94 when image reading by the image scanner is performed in a state in which, in the image reading apparatus 90, the document is placed on the still document reading region 93B of the platen glass 93 and the document pressing cover 91 is closed, as shown in the drawing.

If the document pressing cover 91 is closed, the entire region of platen glass 93 is covered with the document pressing cover 91, and thus external light doe not enter into the document placing table 94. However, at the time of image reading of a document such as a thick book or the like, the document pressing cover 91 cannot be completely closed, and thus external light may enter into the document placing table 94. Further, at the time of image reading of a document having a large size, in order to confirm a reading position, image reading may be performed with the document pressing cover 91 unclosed. In such a case, external light enters into the document placing table 94.

When illuminance of the light source is larger than external light, reflected light at the reference member is sufficiently increased. Therefore, even when some external light is added to reflected light, there is no case in which the read image is drastically degraded. However, if illuminance of the light source is small, reflected light is decreased, the ratio of external light to be added to reflected light becomes large. For example, if external light has influence on the light intensity adjustment, the light source of the image sensor is adjusted to have a smaller light intensity by the amount of external light. Accordingly, there is a condition in that the amount of light to be irradiated onto the document from the light source is decreased, the read image is darkened. In particular, if the image sensor scans the document placed in the still document reading region 93B, as the image sensor is distant from the ADF reading region 93A, the influence of external light is decreased, and thus image degradation drastically appears. In order to solve this situation, for example, there is suggested a unit which prevents external light from entering into the light-receiving element of the image sensor by light-shielding plates provided on both sides of the image sensor (see JP-A-2003-134307).

SUMMARY

By providing the light-shielding plates in the image sensor, for example, external light entering from sides of the image sensor can be shielded, while external light entering into the thickness of the platen glass 93 cannot be shielded. In particular, with demands for a device having a reduced size, the width of the dividing member 95 cannot be sufficiently secured. Further, if the platen glass 93 is formed of one glass plate, there is a condition in that external light has influence on the output adjustment of the image sensor about the reference member.

Aspects of the present invention provide a unit which can obtain a high-quality reading image even when influenced by external light during the light intensity adjustment of a light source in an image reading apparatus for irradiating light from the light source onto a document so as to perform image reading.

Also, aspects of the invention provide a unit which can perform output adjustment of an image reading unit in an image reading apparatus for irradiating light from a light source onto a document so as to perform image reading, with no influence by external light.

According to an aspect of the invention, there is provided an image reading apparatus including: a document placing table having a transparent member on which a document is placed; a document pressing member that is openably provided on the document placing table and covers the transparent member; an image reading unit that irradiates light from a light source onto the document and reads an image on the document based on reflected light; a scanning unit that is disposed on a side opposite to a document placing surface of the transparent member and reciprocates in a predetermined direction along the transparent member with the image reading unit mounted thereon; an open/closed state detecting unit that detects open and closed states of the document pressing member; a control unit that controls an image reading operation of the image reading unit and a reciprocation movement of the scanning unit; and a reference member that serves as a luminance reference of the image reading unit, wherein, when the open/closed state detecting unit detects the open state of the document pressing member, the control unit set a predetermined light intensity set value to a light intensity value of light irradiated from the light source at the time of image reading.

By closing the document pressing member on the document placing table, the document placed on the transparent member is pressed against the transparent member, and the transparent member is covered with the document pressing member. Accordingly, external light is prevented from entering into the document placing table. And then, the control unit operates the scanning unit and the image reading unit so as to perform image reading of the document. Prior to image reading, the control unit performs the light intensity adjustment of the light source of the image reading unit. When the document pressing member is closed about the document placing table, that is, when the open/closed state detecting unit detects the closed state of the document pressing member, the control unit performs the light intensity adjustment about the reference member, and irradiates light from the light source of the image reading unit on the basis of the obtained light intensity adjustment value so as to perform image reading. On the other hand, when the document pressing member is opened about the document placing table, external light enters into the document placing table, and also external light has influence on the reference member. Therefore, when the document pressing member is opened about the document placing table, that is, when the open/closed state detecting unit detects the open state of the document pressing member, the control unit irradiates light from the light source of the image reading unit with the predetermined light intensity set value as the light intensity value, regardless of the obtained light intensity adjustment value.

According to the image reading apparatus, when the document pressing member is closed about the document placing table, the control unit performs the light intensity adjustment about the reference member, and irradiates light from the light source of the image reading unit on the basis of the obtained light intensity adjustment value so as to perform image reading. When the document pressing member is opened about the document placing table, the control unit irradiates light from the light source of the image reading unit with the predetermined light intensity set value as the light intensity value so as to perform image reading. Accordingly, image reading can be performed by the image reading unit without using the light intensity adjustment value influenced by external light when the document pressing member is in the open state. Therefore, the degradation of the read image, such as darkening or blurring, can be prevented.

According to another aspect of the invention, there is provided an image reading apparatus including: a document placing table having a transparent member on which a document is placed;

a document pressing member that is openably provided on the document placing table and covers the transparent member; an image reading unit that irradiates light from a light source onto the document and reads an image on the document based on reflected light; a scanning unit that is disposed on a side opposite to a document placing surface of the transparent member and reciprocates in a predetermined direction along the transparent member with the image reading unit mounted thereon; an open/closed state detecting unit that detects open and closed states of the document pressing member; a control unit that controls an image reading operation of the image reading unit and a reciprocation movement of the scanning unit; a first reference member that is disposed in a region where the transparent member is exposed as an outer surface of the document placing table and serves as a luminance reference of the image reading unit; and a second reference member that is disposed in a region other than the region where the transparent member is exposed as the outer surface of the document placing table and serves as a luminance reference of the image reading unit, wherein, when the open/closed state detecting unit detects the closed state of the document pressing member, the control unit moves the scanning unit to a position facing the first reference member, and performs an output adjustment of the image reading unit about the first reference member, and when the open/closed state detecting unit detects the open state of the document pressing member, the control unit moves the scanning unit to a position facing the second reference member, and performs an output adjustment of the image reading unit about the second reference member.

By closing the document pressing member on the document placing table, the document placed on the transparent member is pressed against the transparent member, and the transparent member is covered with the document pressing member. Accordingly, external light is prevented from entering into the document placing table. And then, the control unit operates the scanning unit and the image reading unit so as to perform image reading of the document. Prior to image reading, the control unit performs the output adjustment of the image reading unit. When the document pressing member is closed about the document placing table, that is, when the open/closed state detecting unit detects the closed state of the document pressing member, the control unit operates the scanning unit and the image reading unit so as to perform the output adjustment about the first reference member. On the other hand, when the document pressing member is opened about the document placing table, external light enters into the document placing table, and also external light has influence on the first reference member. Therefore, when the document pressing member is opened about the document placing table, that is, when the open/closed state detecting unit detects the open state of the document pressing member, the control unit operates the scanning unit and the image reading unit so as to perform the output adjustment about the second reference member.

According to the image reading apparatus, when the document pressing member is closed about the document placing table, the output adjustment about the first reference member is performed. Further, when the document pressing member is opened about the document placing table, the output adjustment about the second reference member is performed. Therefore, even when the document pressing member is opened, the output adjustment of the image reading unit can be accurately performed. As a result, a read image can be prevented from being degraded due to the influence of external light at the time of the output adjustment.

DETAILED DESCRIPTION

Hereinafter, aspects of the invention will be described with reference to the drawings. Incidentally, these aspects are just examples of the invention. The aspects can be appropriately changed within the cope without departing from the subject matter of the invention.

Figure 1:
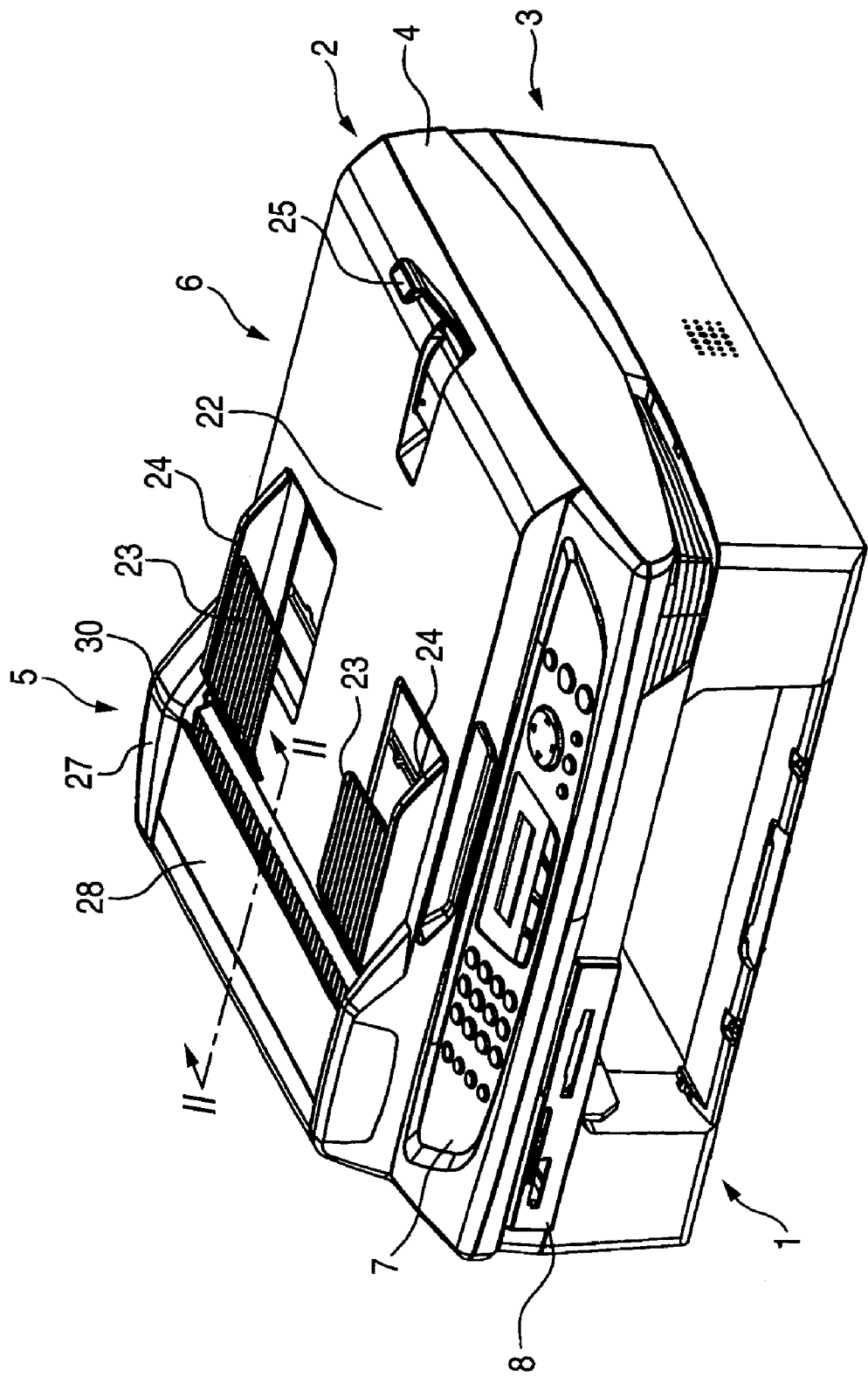
FIG. 1 is a perspective view showing the exterior configuration of a multifunction apparatus according to an aspect of the invention.

FIG. 1 shows the exterior configuration of a multi function apparatus 1 according to an aspect of the invention. A multi function apparatus 1 is a multi function device (MFD) having a scanner function, a printer function, and a facsimile function. An upper part of the multi function apparatus 1 is provided with a scanner unit 2 for reading an image of a document, and a lower part of the multi function apparatus 1 is provided with a printer unit 3 for recording the image on a recording sheet. An image reading apparatus according to an aspect of the invention is implemented as the scanner unit 2 of the multi function apparatus 1. In the aspect, the printer function or the like is an arbitrary mechanism. For example, the image reading apparatus may be implemented as a scanner having only the scanner function.

Hereinafter, the configuration of the scanner unit 2 will be described.

Figure 2:
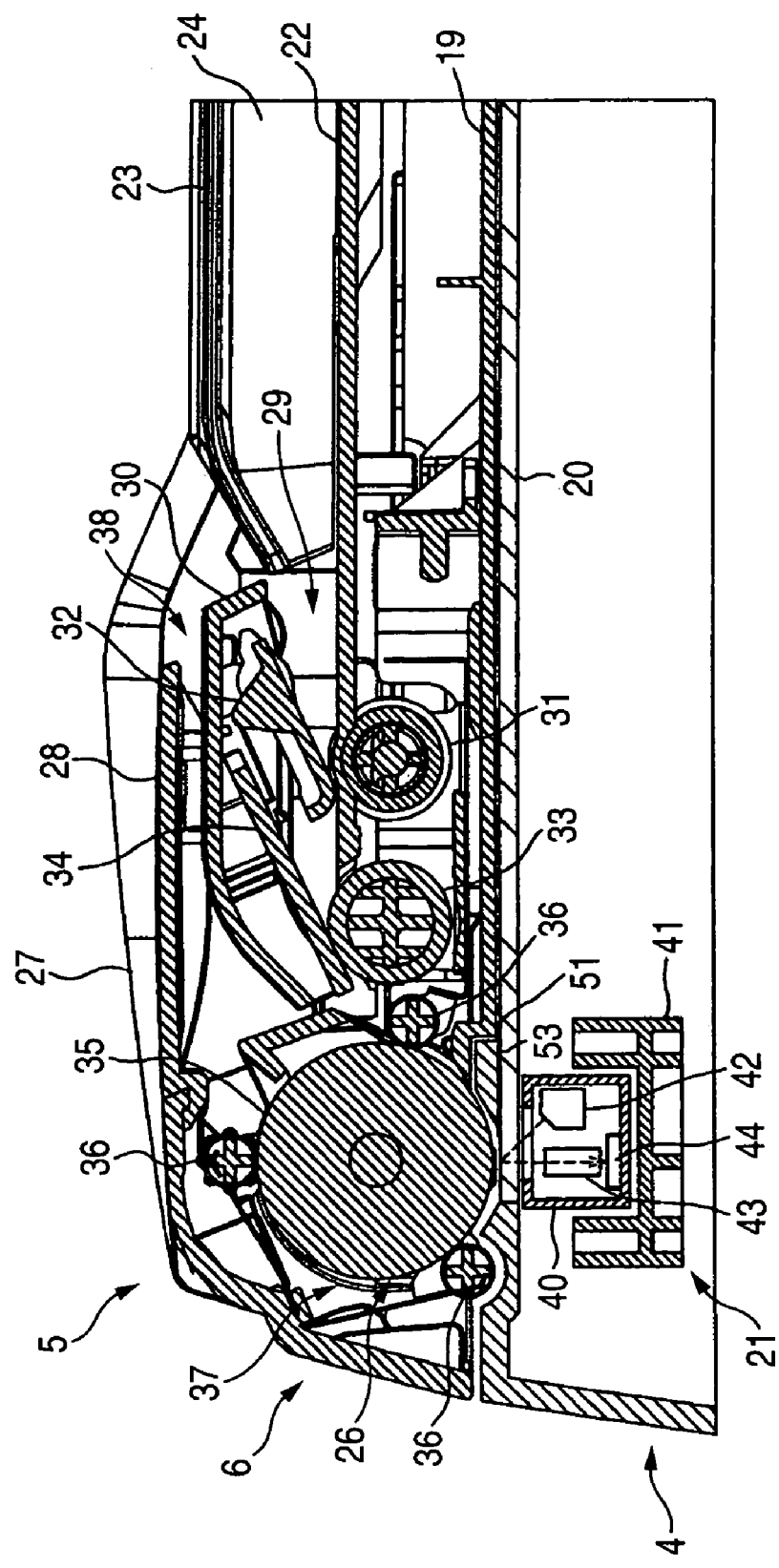
FIG. 2 is a cross-sectional view showing main parts of an ADF taken along the line II-II in FIG. 1.

As shown in FIGS. 1 and 2, in the scanner unit 2, a document pressing cover 6 having an auto document feeder (ADF) 5 serving as an automatic document conveying mechanism is openably mounted on a document placing table 4 serving as a flatbed scanner (FBS) through a hinge on a rear side. The document placing table 4 is configured as a casing of the multi function apparatus 1, and a platen glass 20 (transparent member) is provided at a top surface facing the document pressing cover 6. By opening the document pressing cover 6, the platen glass 20 is exposed as an upper surface of the document placing table 4. Further, by closing the document pressing cover 6, the entire upper surface of the document placing table 4 including the platen glass 20 is covered with the document pressing cover 6. Further, an image reading unit 21 is incorporated into the document placing table 4 so as to face the platen glass 20.

In the document pressing cover 6, the ADF 5 which consecutively conveys the document from a paper supply tray 22 to a paper discharge tray 23 through a predetermined conveying path 26 is provided. During the conveyance by the ADF 5, the document travels through the platen glass 20, and the image reading unit 21 below the platen glass 20 reads the image of the document. The details of the structure of the ADF 5 will be described later. On a lower surface of the document pressing cover 6, in order to press the document placed on the platen glass 20, a pressing member 19 formed of sponge, white sheet, or the like is provided.

On a front surface of the document placing table 4, an operating panel 7 is provided. The operating panel 7 has various operation buttons and a liquid crystal display unit. The multi function apparatus 1 is configured to operate according to instructions from the operating panel 7. Further, the multi function apparatus 1 is connected to a computer and operates by instructions transmitted from the computer through a printer driver or a scanner driver, in addition to the instructions by the operating panel 7.

Further, in an upper left portion on the front surface of the multi function apparatus 1, there is provided a slot portion 8 on which various small memory cards serving as recording media are loaded. An input for reading imaged at are corded in the small memory card loaded on the slot portion 8, displaying information regarding image data on the liquid crystal display unit, and recording an arbitrary image in the recording paper through the printer unit 3 can be conducted from the operating panel 7.

As shown in FIGS. 1 and 2, in the document pressing cover 6, the paper supply tray 22 and the paper discharge tray 23 are provided on upper and lower stages. The paper supply tray 22 is formed integrally with the upper surface of the document pressing cover 6. The document having a plurality of sheets in a stack manner subject to image reading through the ADF 5 is placed on the paper supply tray 22 such that its leading end in a paper supply direction is inserted into the ADF 5. Further, in the paper supply tray 22, a pair of document guides 24 spaced at a predetermined interval in a depthwise direction of the multi function apparatus 1 is provided slidably in the depthwise direction. The document guides 24 erect from the paper supply tray 22 so as to guide both ends in a widthwise direction of the document placed on the paper supply tray 22. When one of the pair of document guides 24 slides, the other document guide 24 also slides in an opposite direction by a known interlock mechanism.

That is, when the width of the document is narrow, and one document guide 24 at the front side of the multi function apparatus 1 slides toward the rear side, the other document guide 24 at the rear side slides toward the front side interlocking with the one document guide 24. Accordingly, the width of the document to be guided by the pair of document guides 24 substantially around the center in the depthwise direction can be narrowed when the width of the document is wide, and one document guide 24 at the front side of the multi function apparatus 1 slides toward the front side, the other document guide 24 at the rear side slides toward the rear side interlocking with the one document guide 24. Accordingly, the width of the document to be guided by the pair of document guides 24 can be widened.

On the pair of document guides 24, the paper discharge tray 23 is integrally formed so as to be spaced at a predetermined gap vertically from the paper supply tray 22. The document discharged from the ADF 5, both ends of which are carried by the paper discharge tray 23, is held in a state of being separated from the document on the paper supply tray 22. Since the length of the paper discharge tray 23 in a paper discharge direction is shorter than the length of the document, the leading end of the document on the paper discharge direction is dropped down from the paper discharge tray 23, such that the document is held above the paper supply tray 22. Therefore, although the leading end portion of the document in the paper discharge direction on the paper discharge tray 23 overlaps a trailing end portion of the document in the paper supply direction on the paper supply tray 22, the leading end portion of the document in the paper supply direction on the paper supply tray 22 and the trailing end portion of the document in the paper discharge direction on the paper discharge tray 23 are held on the upper and lower stages by the paper discharge tray 23. Therefore, there is no case in which the document is mixed up. Further, by shortening the paper discharge tray 23, a required space on the document pressing cover 6 can be made small, and thus the multi function apparatus 1 can be reduced in thickness and size.

Further, at an end portion of the paper supply tray 22 where the ADF 5 is not provided, there is provided a document stopper 25 which changes between an upright posture standing upright from the upper surface of the paper supply tray 22 and a fallen posture being flush with the upper surface of the paper supply tray 22. As shown in FIG. 1, by setting the document stopper 25 in the upright posture, for example, when the document having the same size as that of the paper supply tray 22 is discharged from the ADF 5, the document is regulated by the document stopper 25, and thus the document is prevented from being slipped off from the paper supply tray 22. As such, by causing the discharged document to be caught by the document stopper 25, the area of the paper supply tray 22 can be made small, and the document pressing cover 6 integrally provided with the paper supply tray 22 can be reduced in size. Further, when the document stopper 25 is not required, by setting the document stopper 25 in the fallen posture, the document stopper 25 does not protrude from the document pressing cover 6, and thus the size of the multi function apparatus 1 can be made compact at the time of packing or keeping.

As shown in FIG. 2, inside the ADF 5, the conveying path 26 is substantially formed in a transversely U shape so as to connect the paper supply tray 22 and the paper discharge tray 23. The conveying path 26 has an ADF main body 27 formed to be incorporated into the document pressing cover 6, and an ADF cover 28 openably provided on the ADF main body 27. As shown in FIG. 2, a suction chute portion 29 of the ADF 5 is configured to form a vertical passage having a predetermined width by a horizontal surface formed in the ADF main body 27 extending from the paper supply tray 22 and a guide plate 30 provided inside the ADF cover 28. The conveying path 26 is substantially formed in a transversely U shape from the suction chute portion 29 to a paper discharge chute portion 38 through a curved portion 37. The curved portion 37 and the paper discharge chute portion 38 are also consecutively formed as a passage having a predetermined width by the ADF main body 27, the ADF cover 28, and the guide plate 30.

A conveying unit for conveying the document is provided in the conveying path 26. Specifically, as shown in FIG. 2, a pick-up roller 31, a nip piece 32 pressed into contact with the pick-up roller 31, a separating roller 33, a friction nip piece 34 pressed into contact with the separating roller 33, a conveying roller 35, and a pinch roller 36 pressed into contact with the conveying roller 35 constitute the conveying unit. Incidentally, the configuration of each roller or nip piece constituting the conveying unit is an example. Of course, the conveying unit can be changed into other known conveying units. For example, the number of rollers or the arrangement can be changed or each nip piece can be substituted with a pinch roller.

Figure 8:
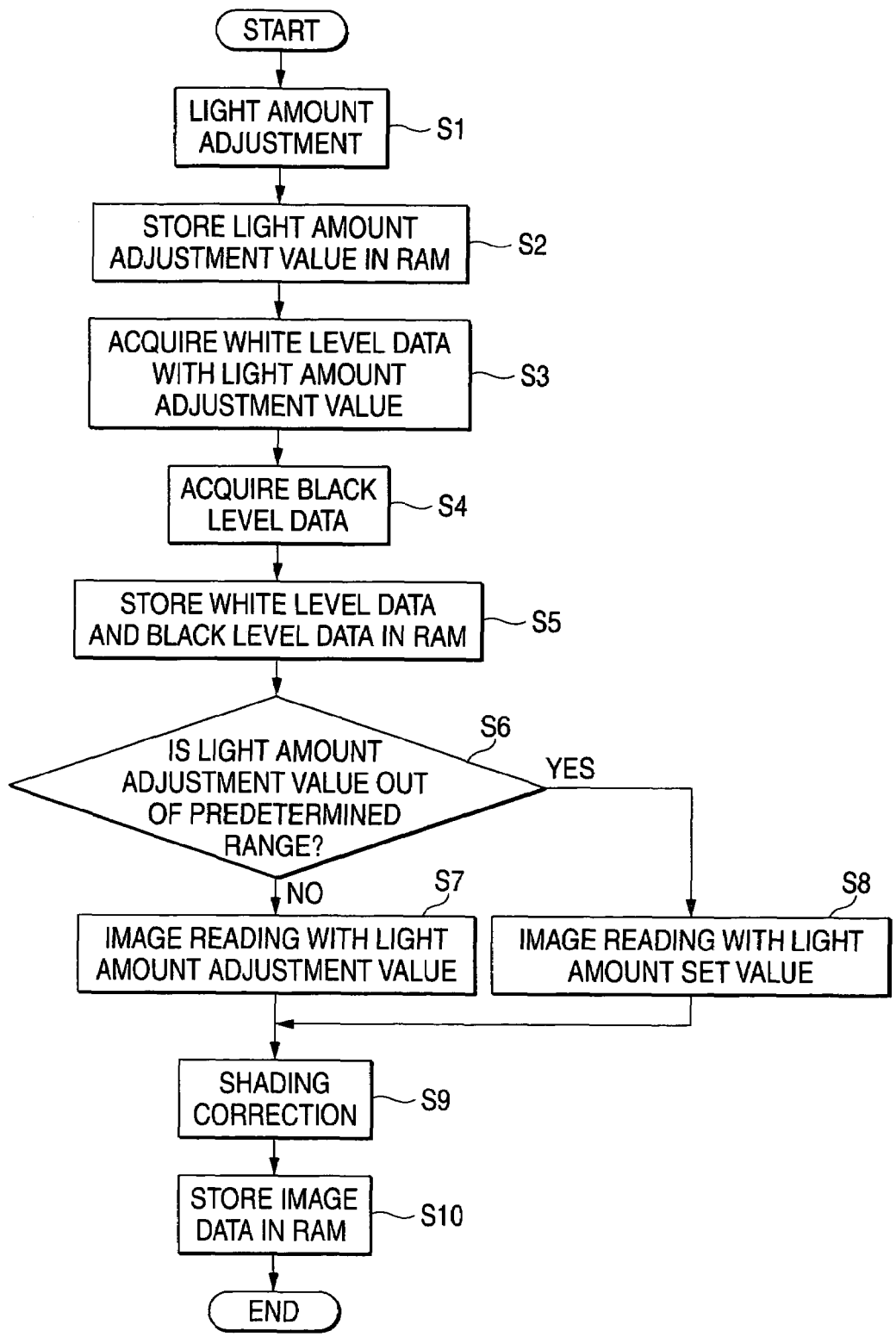
FIG. 8 is a flowchart showing an output adjustment of a CIS unit.

As shown in FIG. 2, the pick-up roller 31 is rotatably provided at the center of the suction chute portion 29 such that a part of its roller surface is exposed from the upper surface of the horizontal surface formed in the ADF main body 27. Further, the separating roller 33 is rotatably provided at a position spaced from the pick-up roller 31 in the paper supply direction such that a part of its roller surface is exposed from the upper surface of the horizontal surface formed in the ADF main body 27. Driving force from a conveying motor 62 (see FIG. 8) is applied to the pick-up roller 31 and the separating roller 33, and the pick-up roller 31 and the separating roller 33 rotate. Further, the pick-up roller 31 and the separating roller 33 have the same diameter, and rotate at the same peripheral velocity. Further, for the application of driving force to the pick-up roller 31, a one-cycle clutch is provided, and the pick-up roller 31 can run idle for one cycle.

The nip piece 32 is pivotably provided at a position of the guide plate 30 facing the pick-up roller 31 in a direction in and out of contact with the pick-up roller 31. Further, the nip piece 32 is elastically biased downward by a spring member (not shown), and is pressed into contact with the roller surface of the pick-up roller 31 without nipping the document. Similarly, the friction nip piece 34 is pivotably provided at a position of the guide plate 30 facing the separating roller 33 in a direction in and out of contact with the separating roller 33. Further, the friction nip piece 34 is elastically biased downward by a spring member (not shown), and is pressed into contact with the roller surface of the separating roller 31 without nipping the document. The document is nipped by the nip piece 32 and the friction nip piece 34, and the document is pressed into contact with the pick-up roller 31 and the separating roller 33. As a result, rotation force of the pick-up roller 31 and the separating roller 33 is applied to the document.

The conveying roller 35 is provided in the curved portion 37 having the transversely U shape of the conveying path 26. The conveying roller 35 has an outer diameter to the extent that its roller surface forms a part of the curved portion 37.

Like the pick-up roller 31 and the separating roller 33, the conveying roller 35 is applied with driving force from the conveying motor 62 and rotates.

In the periphery of the conveying roller 35, pinch rollers 36 are provided at three places. Each pinch roller 36 is axially and elastically biased by a spring piece, is rotatably supported on the ADF main body 27 or the ADF cover 28, and is pressed into contact with the roller surface of the conveying roller 35. When the conveying roller 35 rotates, the pinch rollers 36 rotate accordingly. By the pinch rollers 36, the document is pressed into contact with the conveying roller 35, and rotation force of the conveying roller 35 is applied to the document.

On the downstream side of the conveying roller 35 in the document conveying direction, the paper discharge chute portion 38 is formed. The paper discharge chute portion 38 is formed between the ADF cover 28 and the guide plate 30 so as to be connected to the curved portion 37 of the conveying path 26 having the inner surface of the ADF cover 28 and the conveying roller 35. Therefore, the document supplied from the paper supply tray 22 to the conveying path 26 sequentially travels through the suction chute portion 29, the curved portion 37, and the paper discharge chute portion 38, and then is discharged to the paper discharge tray 23.

The ADF cover 28 is rotatable upward around a position closer to the paper supply tray 22 side than the pick-up roller 31. By opening the ADF cover 28, the suction chute portion 29 and the curved portion 37 is opened, and the pick-up roller 31 and the separating roller 33, and the nip piece 32 and the friction nip piece 34 are out of contact with each other. Therefore, by opening the ADF cover 28, paper jamming generated in the conveying path 26 can be resolved, and the maintenance inside the ADF 5 can be performed.

Figure 3:
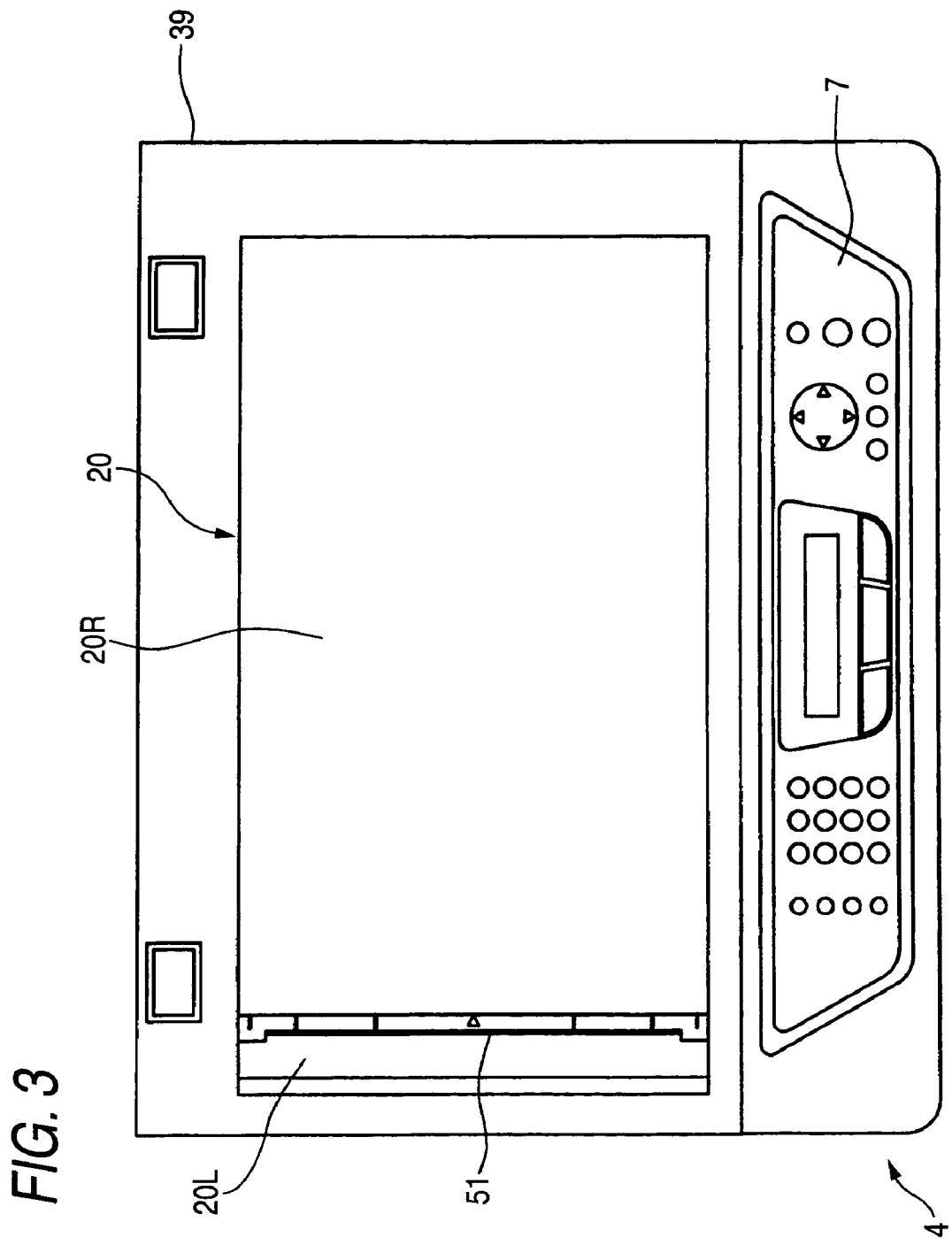
FIG. 3 is a plan view showing the configuration of a document placing table.

As shown in FIGS. 2 and 3, the platen glass 20 is provided on the upper surface of the document placing table 4. When the scanner unit 2 is used as the FBS, the document is placed on the platen glass 20. The platen glass 20 is formed of one transparent glass plate. A casing 39 of the document placing table 4 has an opening at the center of its upper surface for exposing the platen glass 20. The platen glass 20 is sufficiently larger than the opening, and a region of the platen glass 20 from the opening becomes a document reading region.

In the casing 39, that is, on a side opposite to the document placing surface of the platen glass 20, the image reading unit 21 is provided. The casing 39 is formed of synthetic resin. In the casing 39, a plate for dividing a portion where the image reading unit 21 is provided and a portion where a substrate of the operating panel 7 is provided. Also, a support rib for supporting the platen glass 20, boss portions for screwing various members, through holes for electrical wiring lines, and the like are provided. These can be appropriately designed according to the design of the document placing table 4, and the detailed descriptions thereof will be omitted.

As shown in FIG. 2, the image reading unit 21 has the CIS unit 40 (image reading unit), a carriage 41 (scanning unit), and a scanning mechanism (not shown). The CIS unit 40 is a so-called contact image sensor which irradiates light from light sources 42 onto the document through the platen glass 20, and condenses reflected light from the document on light-receiving elements 44 by a lens 43 so as to convert condensed light into electrical signals. The light-receiving elements 44 are arranged in a row in a widthwise direction of the conveying roller 35, that is, in a widthwise direction of the document, for each chip. The light sources 42 and the lens 43 are also arranged in the same direction. Further, as the light sources 42, a three-color light-emitting diode (LED) generating separated red (R), green (G), and blue (B) light components is used.

Figure 4:
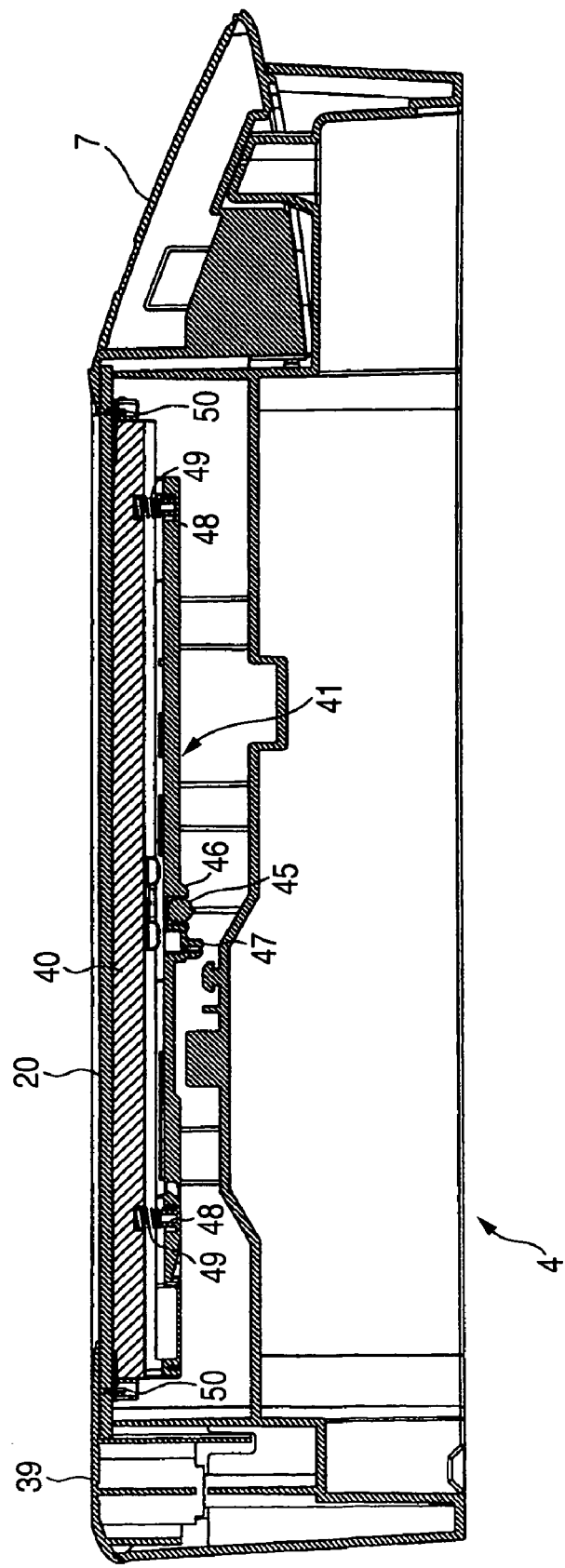
FIG. 4 is a cross-sectional view of the document placing table showing the configuration of a carriage.

As shown in FIG. 4, the CIS unit 40 is mounted on the carriage 41 and is closely faced to the platen glass 20. The carriage 41 is provided below the platen glass 20 to scan by a belt driving mechanism serving as the scanning mechanism. The carriage 41 is fitted into a guide shaft 45 erected to extend over the casing 39 of the document placing table 4 in the widthwise direction, and is driven by the belt driving mechanism (not shown) to slide and move on the guide shaft 45. By mounting the CIS unit 40 on the carriage 41 so as to be closely faced to the platen glass 20 and moving the carriage 41 on the guide shaft 45, the CIS unit 40 scans along the platen glass 20.

As shown in FIG. 4, the carriage 41 carries the CIS unit 40 such that the CIS unit 40 is mounted thereon. At the lower surface of the carriage 41, there is formed a shaft receiving portion 46 which crosses over the guide shaft 45 from the above such that the guide shaft 45 is fitted into the shaft receiving portion 46. By fitting the guide shaft 45 into the shaft receiving portion 46, the carriage 41 is carried by the guide shaft 45 and slides in the widthwise direction of the guide shaft 45. On a lateral side of the shaft receiving portion 46, a belt grab portion 47 is provided to protrude downward. The belt grab portion 47 grabs a timing belt of the belt driving mechanism so as to connect the timing belt to the carriage 41. Accordingly, driving force is applied from the belt driving mechanism to the carriage 41, and thus the carriage 41 moves on the guide shaft 45. Moreover, the belt driving mechanism is configured such that the timing belt is rolled up between a driving pulley and a driven pulley, the rotation of the motor is output to the shaft of the driving pulley, and the timing belt peripherally moves by the rotation of the driving pulley.

Further, in the carriage 41 on which the CIS unit 40 is mounted, two spring receiving portions 48 are formed at left and right places. Coil springs 49 positioned by the spring receiving portions 48 are provided between the CIS unit 40 and the carriage 41. By the coil springs 49, the CIS unit 40 mounted on the carriage 41 is pressed against and is closely in contact with the lower surface of the platen glass 20. At both ends of the CIS unit 40, rollers 50 are provided. By the rollers 50, the CIS unit 40 pressed against the lower surface of the platen glass 20 smoothly moves according to the movement of the carriage 41 while being closely in contact with the lower surface of the platen glass 20.

As shown in FIG. 3, on the upper surface of the platen glass 20, there is provided a dividing member 51 for dividing a region where the platen glass 20 is exposed as the upper surface of the document placing table 4. The dividing member 51 is a flat-plate member having a long axis in a depthwise direction or the document placing table 4, that is, in an extension direction of the image reading unit 21. As shown in FIG. 3, the dividing member 51 divides the platen glass 20 into left and right regions. As shown in FIG. 2, one side (a left side in the drawing) of the platen glass 20 reaches below the conveying roller 35 and forms a reading surface when image reading is performed by using the ADF 5.

On the other hand, the other side of the platen glass 20 forms the document placing surface when the scanner unit 2 is used as the FBS. The dividing member 51 divides the platen glass 20 into left and right sides, that is, a conveyed document reading region 20L serving as the reading surface in the ADF 5, and a still document reading region 20R serving as the document placing surface in the FBS. Further, when the document is placed on the still document reading region 20R, the dividing member 51 is used as a positioning reference of the document. Therefore, the document is placed on the still document reading region 20R with a central position described in the dividing member 51 as a reference. In the dividing member 51, marks representing the central position or positions of both ends of various document sizes such as A4 size, B5 size, and the like are described.

Figure 5:
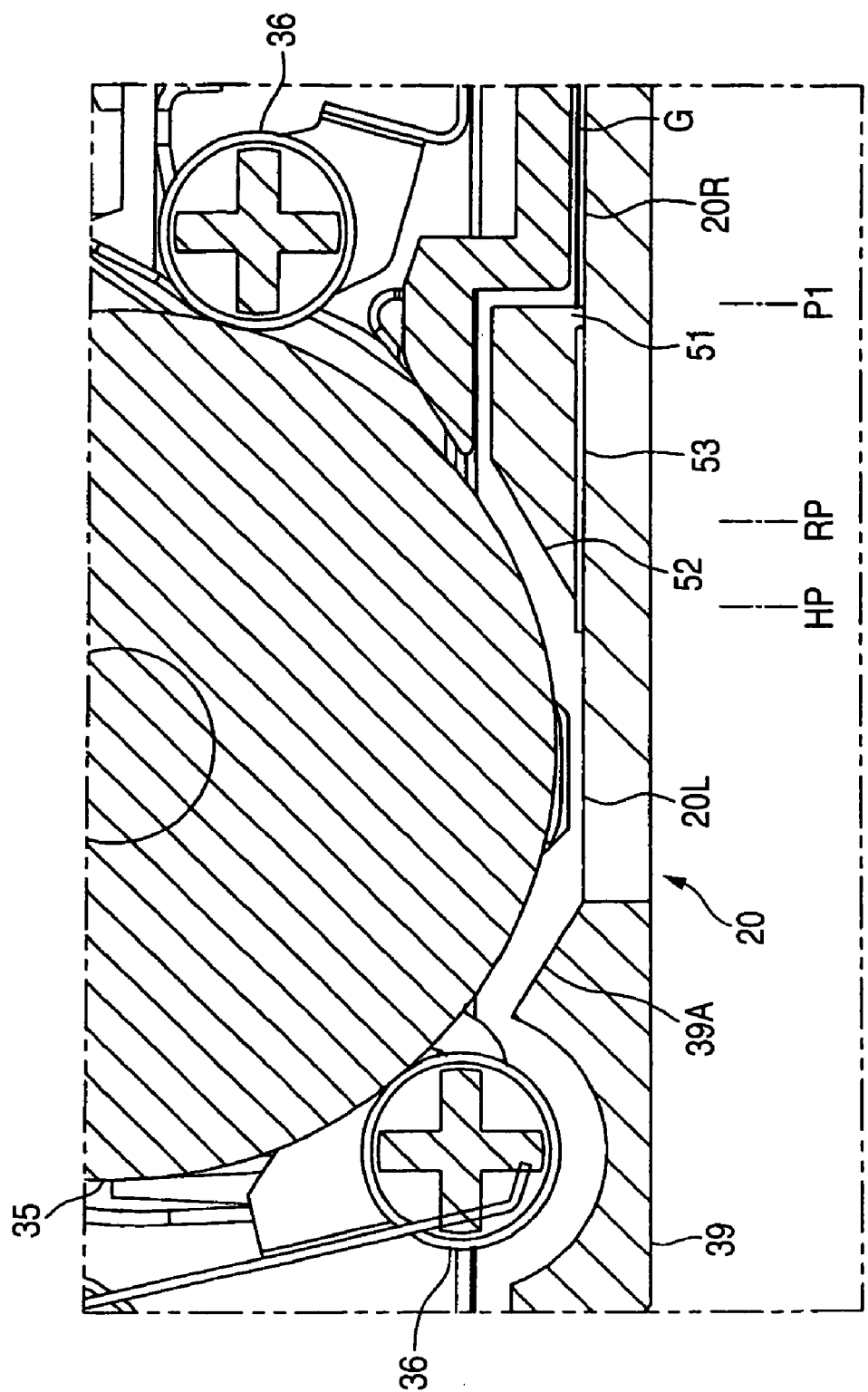
FIG. 5 is an enlarged cross-sectional view showing the peripheral configuration of a reference member.

Further, as shown in FIG. 5, the dividing member 51 has a guide surface 52 which is formed at a surface facing the document pressing cover 6. The guide surface 52 is formed by inclining the surface of the dividing member 51 facing the conveying roller 35 to be reduced in thickness toward the conveyed document reading region 20L of the platen glass 20. By the guide surface 52, the leading end of the document to be conveyed from the paper supply tray 22 to the conveying path 26 is guided to the conveyed document reading region 20L. Accordingly, the conveyance of the document to the conveyed document reading region 20L can be smoothly performed, by realizing a common use of parts, a reduction in size and in cost of the scanner unit 2 can be realized, without providing a guide member separately from the dividing member 51.

Further, the guide surface 52 guides the document before reading to the conveyed document reading region 20L, and thus a lowermost portion of the guide surface 52 does not need to be dented from the surface of the platen glass 20. That is, a guide surface 39A formed on a downstream side of the conveyed document reading region 20L guides the document after reading to scoop up from the conveyed document reading region 20L. If a lower most end of the guide surface 39A protrudes from the surface of the platen glass 20, the leading end of the document after reading is in contact with the lowermost end of the guide surface 39A, which causes jamming or the like. Therefore, the lowermost end of the guide surface 39A is preferably dented from the platen glass 20.

In contrast, even when the lowermost end of the guide surface 52 of the dividing member 51 protrudes from the platen glass 20, there is no case in which the document is in contact with the dividing member 51 and jamming occurs. Therefore, by dividing the platen glass 20 into the conveyed document reading region 20L and the still document reading region 20R, the lowermost end of the guide surface 52 of the dividing member 51 does not need to be dented from the platen glass 20. Further, the regions can be configured by one platen glass 20, and then the dividing member 51 can be provided on the upper surface of the platen glass 20. Accordingly, the configurations of the platen glass 20 and the dividing member 51 can be simplified, thereby realizing ease of assembling of the scanner unit 2.

Figure 6:
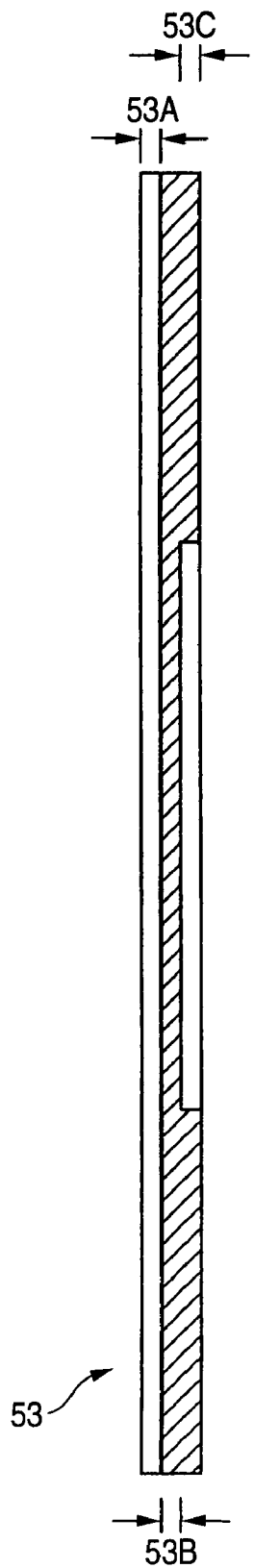
FIG. 6 is a plan view showing the configuration of the reference member.

As shown in FIG. 5, on the lower surface of the dividing member 51, a reference member 53 is provided between the dividing member 51 and the platen glass 20. The reference member 53 serves as a luminance reference of the CIS unit 40. Specifically, the reference member 53 is a thin-film stripe member which substantially covers the entire lower surface of the dividing member 51. As shown in FIG. 6, three regions are provided in a sub-scanning direction of the CIS unit 40, that is, in a horizontal direction in the drawing. A left region 53A is a white colored region, and is used for a light intensity adjustment or the acquisition of white level data of the CIS unit 40. A central region 53B is a black colored region, and is used for the acquisition of black level data of the CIS unit 40. Further, a boundary between the left region 53A and the central region 53B serves as a reference of the sub-scanning direction of the CIS unit 40. A right region 53C is a region, a depthwise center of which is colored white and both ends thereof are colored black. The right region 53C serves as a reference of a main scanning direction of the CIS unit 40. The reference member 53 is provided between the dividing member 51 and the platen glass 20 such that each region is in the same direction as the extension direction of the CIS unit 40.

As such, by providing the reference member 53 on the lower surface of the dividing member 51, a space for providing the reference member 53 at a scanning end on a left side of the document placing table 4 does not need to be secured, and thus the document placing table 4 can be reduced in size. In particular, by saving a space on a side where the conveyed document reading region 20L is provided in the widthwise direction of the document placing table 4, that is, on a left side of the document placing table 4 in FIG. 3, the conveying roller 35 of the ADF 5 can be disposed at an end of the document pressing cover 6 in the widthwise direction as close as possible, and thus the size of the scanner unit 2 in the widthwise direction can be made small. Further, by causing the dividing member 51 and the reference member 53 to substantially have the same width, the width of the dividing member 51 becomes small. Accordingly, the region of the platen glass 20 exposed on the upper surface of the document placing table 4 can be made small. Therefore, the area of the upper surface of the document placing table 4 becomes small, and thus the scanner unit 2 can be reduced in size.

Figure 7:
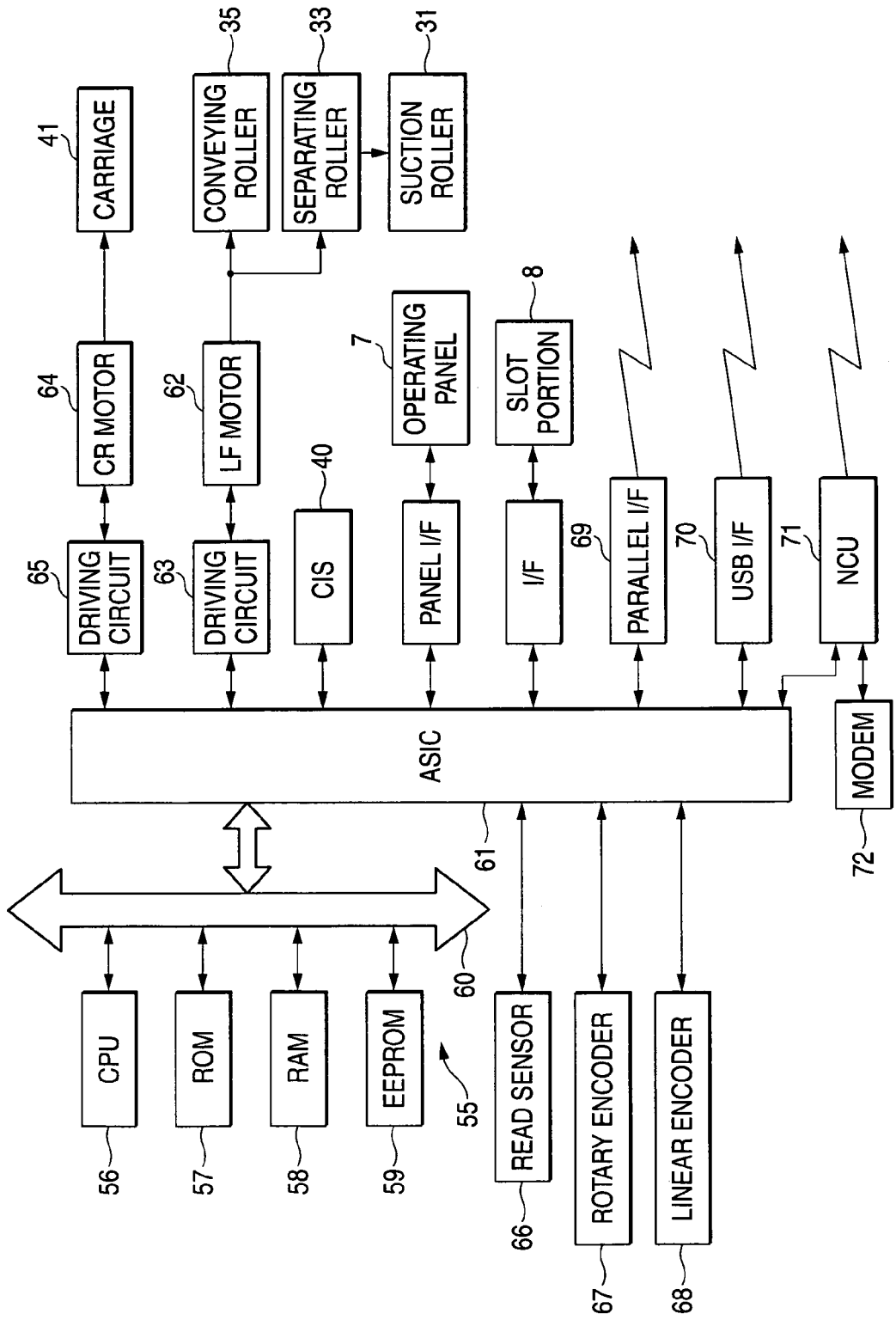
FIG. 7 is a block diagram showing the configuration of a control unit of the multi function apparatus.

FIG. 7 shows the configuration of a control unit 55 of the multi function apparatus 1. The control unit 55 controls the entire operation of the multi function machine 1 including the scanner unit 2 and the printer unit 3. However, in this aspect, the parts of the printer unit 3 do not need to be described in detail, and thus the parts of the printer unit 3 are not shown in the drawing. As shown in FIG. 7, the control unit 55 is a micro computer primarily having a CPU 56, a ROM 57, a RAM 58, and an EEPROM (Electrically Erasable and Programmable ROM) 59, and is connected to an ASIC (Application Specific Integrated Circuit) 61 through a bus 60.

The ROM 57 stores programs for controlling various operations of the multi function apparatus 1 and the like. The RAM 58 is used as a storage area or a work area for temporarily storing various kinds of data used when the CPU 56 executes the programs. For example, the light intensity adjustment values of the light sources 42 of the CIS unit 40 or white level data and black level data acquired about the reference member 53 are stored in the RAM 58. Further, the EEPROM 59 is a storage area which stores various setups or flags which should be held even after power is turned off. For example, a light intensity set value of the CIS unit 40 is stored. The light intensity set value is a light intensity adjustment value when the CIS unit 40 performs a light intensity adjustment described below about the reference member 53 in a state in which the document pressing cover 6 is closed. The light intensity set value is input and set in advance at the time of manufacturing or shipping the multi function apparatus 1.

According to the command from the CPU 56, the ASIC 61 generates a phase excitation signal or the like used for applying power to the conveying (LF) motor 62 and sends the signal to a driving circuit 63 of the conveying motor 62. Power is applied to the conveying motor 62 by means of the driving signal through the driving circuit 63, and thus the rotation of the conveying motor 62 is controlled.

The driving circuit 63 drives the conveying motor 62 connected to the pick-up roller 31, the separating roller 33, and the conveying roller 35. The driving circuit 63 receives the output signal from the ASIC 61 and forms an electrical signal for rotating the conveying motor 62. The conveying motor 62 rotates by the electrical signal, and rotation force of the conveying motor 62 is applied to the separating roller 33 and the conveying roller 35 through a known driving mechanism having gears or driving shafts.

Similarly, according to the command from the CPU 56, the ASIC 61 generates a phase excitation signal or the like used for applying power to the carriage (CR) motor 64 and sends the signal to a driving circuit 65 of the carriage motor 64. Power is applied to the carriage motor 64 by means of the driving signal through the driving circuit 65, and thus the rotation of the carriage motor 64 is controlled.

The driving circuit 65 drives the carriage motor 64 of the belt driving mechanism connected to the carriage 41. The driving circuit 65 receives the output signal from the ASIC 61 and forms an electrical signal for rotating the carriage motor 64. The carriage motor 64 rotates by the electrical signal, and rotation force is applied to the carriage 41 through the known belt driving mechanism. As a result, the carriage 41 is scanned.

Further, a lead sensor 66 which detects the document in the conveying path 26, a rotary sensor 67 which is provided to detect the rotation amount of the separating roller 33 or the conveying roller 35, and a linear encoder 68 which detects the movement amount of the carriage 41 are connected to the ASIC 61.

Further, the CIS unit 40 which performs image reading of the document to be conveyed via the conveying path 26 is connected to the ASIC 61. On the basis of a control program stored in the ROM 57, the light intensity adjustment or the acquisition of white level data and black level data, and image reading are performed. Further, in this aspect, the CIS unit 40 also functions as an open/closed state detecting unit which detects an open/closed state of the document pressing cover 6. Specifically, by opening the document pressing cover 6, the platen glass 20 on the upper surface of the document placing table 4 is exposed, and external light enters into the document placing table 4 through the platen glass 20. On the other hand, when the document pressing cover 6 is closed, the platen glass 20 is covered with the document pressing cover 6, and thus external light is shielded and does not enter into the document placing table 4.

The CIS unit 40 is provided inside the document placing table 4. Accordingly, as described below, when the CIS unit 40 performs the light intensity adjustment about the reference member 53, the open/closed state of the document pressing cover 6 can be judged based on whether or not the light intensity adjustment value is within a predetermined range. That is, if external light enters, even when the light intensity of the light source 42 of the CIS unit 40 is small by the amount of external light, a predetermined output is obtained, and thus the light intensity adjustment value becomes small. Therefore, if the light intensity adjustment value is smaller than the predetermined range, it can be judged that the document pressing cover 6 is opened. The open/closed state detecting unit has the CPU 56, the ROM 57, the RAM 58, the EEPROM 59, and the CIS unit 40. Further, the predetermined range is set on the basis of a value obtained by multiplying the light intensity adjustment value stored in the EPROM 59 by a predetermined coefficient.

As such, by judging the open/closed state of the document pressing cover 6 on the basis of the detection of external light by the CIS unit 40, a sensor for detecting the open/closed state of the document pressing cover 6 does not need to be separately provided, and thus the scanner unit 2 can be reduced in size and cost. Moreover, the CIS unit 40 may continuously operate so as to detect external light while the power supply of the multi function apparatus 1 is turned on. In this case, if the CIS unit 40 detects external light, that is, if the output of the CIS unit 40 is out of a predetermined range, it can be judged that the document pressing cover 6 is in the open state. Further, if the output is in the predetermined range, it can be judged that the document pressing cover 6 is in the closed state. Further, the predetermined range is set, for example, on the basis of a black level reference signal output by the CIS unit 40.

In addition, the operating panel 7 which performs the operation instruction of the multi function apparatus 1, the slot portion 8 into which various small memory cards are inserted, a parallel interface 69 and a USB interface 70 which perform data transmission and reception with an external apparatus such as a personal computer through a parallel cable or a USB cable, and an NCU (Network Control Unit) 71 or a MODEM 72 which implements a facsimile function are connected to the ASIC 61.

Hereinafter, the operation of the scanner unit 2 will be described.

When the scanner unit 2 is used as the FBS, the document pressing cover 6 is opened, and the document G is placed on the still document reading region 20R of the platen glass 20. And then, the document pressing cover 6 is closed, and the document G is fixed onto the platen glass 20. Subsequently, by pressing a start button of the operating panel 7, the control unit 55 moves the carriage 41 along the platen glass 20, the image of the document G placed on the still document reading region 20R of the platen glass 20 is read by the CIS unit 40 during the movement.

On the other hand, when the ADF 5 is used, the document pressing cover 6 is set to be in the closed state about the document placing table 4. And then, the document G to be read is placed on the paper supply tray 22. The document G may have one or more sheets. For example, if image reading of plural documents G having the same size is performed, the documents G are superimposed and arranged, and one ends thereof are inserted from the paper supply tray 22 into the suction chute portion 29.

Next, when the start button of the operating panel 7 is pressed, the control unit 55 drives the motor so as to rotate the pick-up roller 31, the separating roller 33, and the conveying roller 35 with a predetermined timing. And then, the documents G are separated and sent to the conveying path 26 one by one from the lowermost document G, to which rotation force of the pick-up roller 31 and the separating roller 33 is directly applied. The supplied document G is guided to the conveying path 26 and conveyed to the conveyed document reading region 20L, and then image reading of the document G is performed by the CIS unit 40 which tables still below the conveyed document reading region 20L. Next, after image reading is completed, the document G is discharged from the paper discharge chute portion 38 to the paper discharge tray 23.

For image reading by the scanner unit 2, before the CIS unit 40 starts image reading of the document G, the light intensity adjustment of the light source 42 and the acquisition of white level data and black level data are performed as the output adjustment of the CIS unit 40.

The detailed description will be given with reference to FIGS. 5 to 10. First, the control unit 55 moves the carriage 41 to a reference position RP. The reference position RP is the boundary between the left region 53A and the central region 53B of the reference member 53 (see FIG. 6), which can be detected when the output of the CIS unit 40 is changed between white and black. And then, prior to image reading, the carriage 41 is moved below the reference member 53, that is, to a home position HP in FIG. 5. The home position HP is a position corresponding to the left region 53A of the reference member 53. As such, by setting a standby position of the CIS unit 40 with the same position as the reference member 53 as the home position HP, the movement distance of the carriage 41 can be shortened until the light intensity adjustment is performed about the reference member 53, and the image reading operation can be performed at high speed.

Figure 9A:
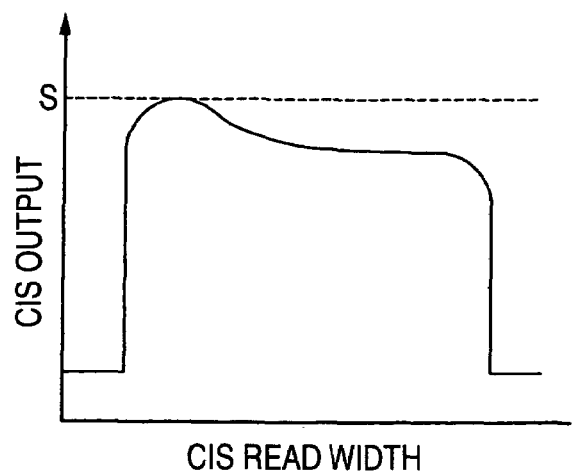
FIG. 9A is a graph showing an output of the CIS unit at the time of a light intensity adjustment.

Next, the control unit 55 performs the light intensity adjustment of the light source 42 in the CIS unit 40 about the reference member 53 (Step S1). Specifically, light is initially irradiated onto the region 53A of the reference member 53 from the light source 42 with a sufficiently small light intensity. In this case, reflected light from the region 53A becomes small, and thus the output from the light-receiving element 44 of the CIS unit 40 is small. And then, the light intensity of the light source 42 is gradually increased until the output of the light-receiving element 44 reaches a desired value. As shown in FIG. 9A, the light intensity is stored in the RAM 58 as the light intensity adjustment value when the output of the CIS unit 40 reaches the desired value S (Step S2). Incidentally, the light intensity adjustment of one color among three colors is exemplary described herein.

Subsequently, the control unit 55 acquires white level data and black level data of the CIS unit 40 about the reference member 53 (Steps S3 and S4). Specifically, the control unit 55 moves the carriage 41 to a position corresponding to the left region 53A of the reference member 53 and irradiates light from the light source 42 of the CIS unit 40 onto the region 53A with the light intensity adjustment value. And then, the control unit 55 converts reflected light from the region 53A by the light-receiving element 44 so as to acquire white level data (Step S3). The acquisition of white level data may be performed about the region 53A several times, and the average may be used. Further, the acquisition of white level data may be performed while moving the carriage 41 within the range of the region 53A.

After white level data is acquired, the control unit 55 drives the carriage motor 64 so as to move the carriage 41 to a position corresponding to the central region 53B of the reference member 53. And then, the control unit 55 acquires black level data from the electrical signal of the light-receiving element 44 obtained in a state in which the light source 42 is turned off (Step S4). Similarly, the acquisition of black level data may be performed several times or may be performed while moving the carriage 41 within the range of the region 53B. Further, the acquisition of white level data and the acquisition of black level data can be performed in a reversed order. White level data and black level data obtained in such a manner are stored in the RAM 58 to be used as reference data for the shading correction at the time of image reading (Step S5).

Subsequently, it is judged whether or not the obtained light intensity adjustment value is in the predetermined range (Step S6). The predetermined range is determined on the basis of the light intensity adjustment value stored in the EEPROM 59. Specifically, the predetermined range is determined by multiplying the light intensity set value input in the EEPROM 59 at the time of the shipment of the multi function apparatus 1 by the predetermined coefficient, for example, 0.8. The light intensity set value is a light intensity adjustment value when the document pressing cover 6 is closed and the light intensity adjustment is performed. The light intensity set value is input and set in the EEPROM 59 in advance.

As shown in FIG. 5, when the document pressing cover 6 is in the closed state, the conveyed document reading region 20L is covered with the conveying roller 35 and the like, and also the entire region of the platen glass 20 is covered with the document pressing cover 6. Accordingly, there is no case in which external light enters into the periphery of the reference member 53. Therefore, as shown in FIG. 9A, when the light intensity adjustment is performed about the reference member 53 such that the output of the CIS unit 40 becomes the predetermined output S, the almost same value as the light intensity set value is obtained as the light intensity adjustment value. Therefore, even when a variation slightly exists in view of stability of the light source 42 or the light-receiving element 44, the light intensity adjustment value within the predetermined range from the light intensity set value is obtained. As a result, when the obtained light intensity adjustment value is in the predetermined range with respect to the light intensity set value, the control unit 55 judges that the document pressing cover 6 is in the closed state.

Figure 10:
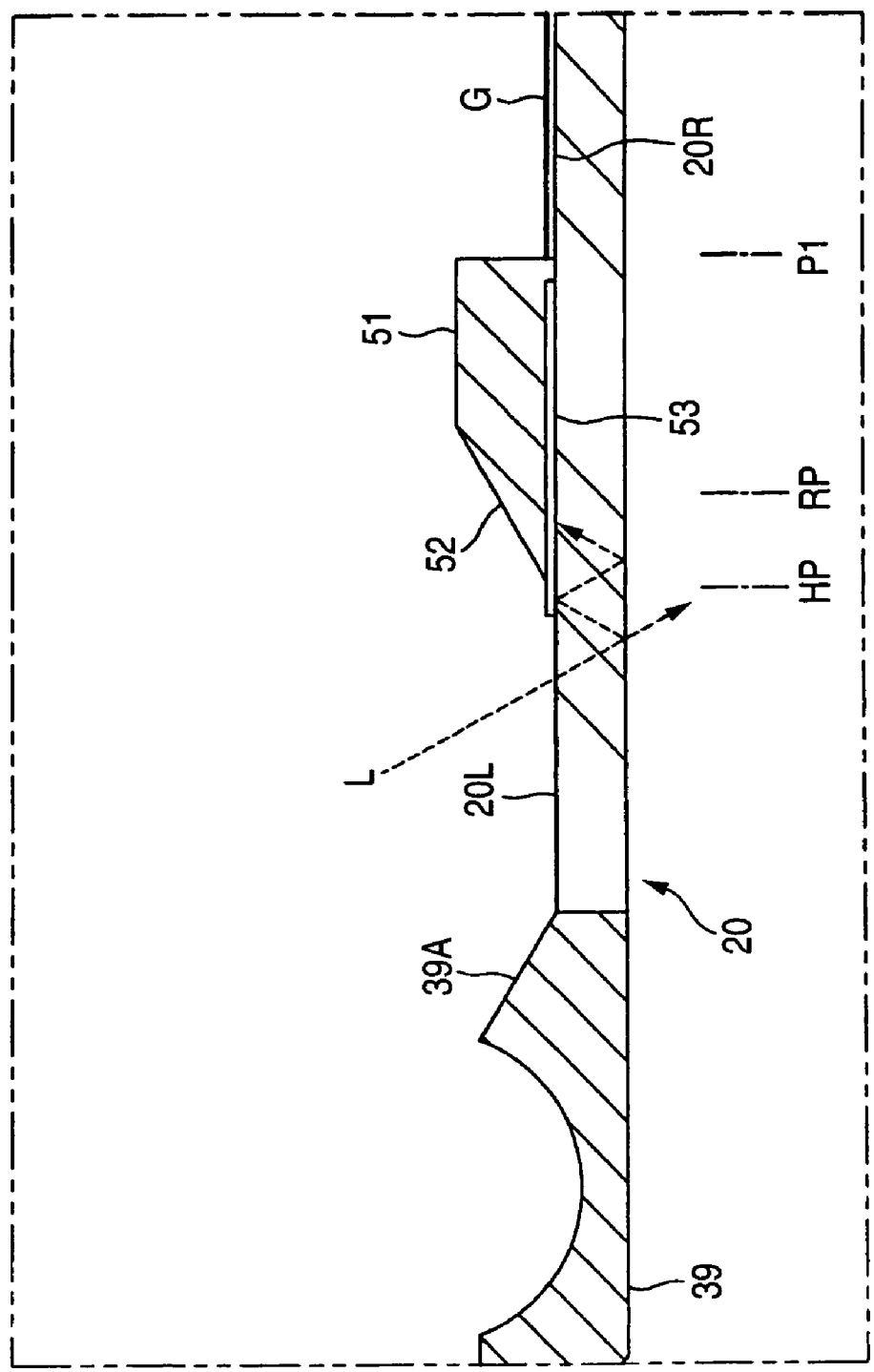
FIG. 10 is an enlarged cross-sectional view showing the peripheral configuration of the reference member in a state in which a document pressing cover is closed.

On the other hand, when the scanner unit 2 is used as the FBS, a thick document such as a book or the like is placed on the platen glass 20, the document pressing cover 6 may not be completely closed. Further, in case of reading a part of a document having a size larger than the still document reading region 20R of the platen glass 20, it is assumed that, in order to confirm a reading place, image reading is performed with the document pressing cover 6 unclosed. As shown in FIG. 10, when the document pressing cover 6 is in the open state, since the conveyed document reading region 20L is exposed, external light enters from the conveyed document reading region 20L into the document placing table 4.

Figure 9B:
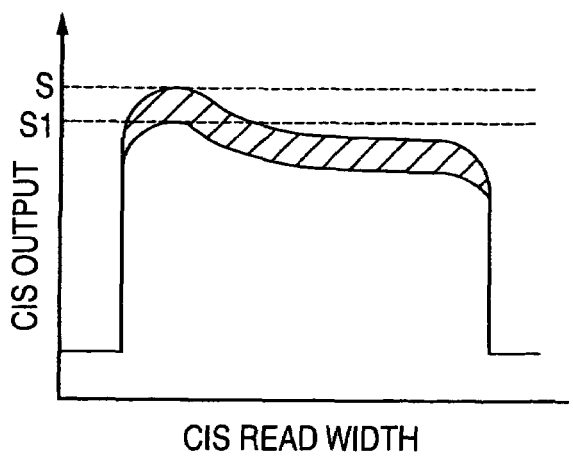
FIG. 9B is a graph showing an output of the CIS unit at the time of a light intensity adjustment in a state in which a document pressing cover is opened.

External light is reflected by members inside the document placing table 4, enters into the reference member 53 while being reflected within the thickness of the platen glass 20, or enters into the CIS unit 40 disposed at the home position HP. In particular, as shown in FIG. 2, in the CIS unit 40, the light-receiving element 44 is provided upward, and thus external light L entering from the upper surface of the CIS unit 40 into the CIS unit 40 is likely to have influence on the output of the light-receiving element 44. Therefore, when the light intensity adjustment is performed about the reference member 53 in a state in which external light L enters, as shown in FIG. 9B, even when the amount of light irradiated from the light source 42 is small by the light intensity of external light L, the light-receiving element 44 receives the light intensity which is the sum of the amount of reflected light and external light L, and thus the desired output S is obtained. As a result, the light source 42 has a smaller light intensity adjustment value by the amount of external light indicated by a hatching region in the drawing, like an output S1. Accordingly, when the coefficient is 0.8 and the light intensity adjustment value of the output S1 is less than 80 percent of the light intensity set value, the control unit 55 judges that the document pressing cover 6 is in the open state.

Subsequently, the control unit 55 moves the carriage 41 to a position P1 which is a reading start position in the still document reading region 20R. And then, in the case where it is judged that the document pressing cover 6 is in the closed state, the control unit 55 moves the carriage 41 along the platen glass 20 while irradiating light from the light source 42 with the light intensity adjustment value obtained about the reference member 53, and converts reflected light from the document G into electrical signals by the light-receiving element 44 so as to perform image reading (Step S7). In the case where the document pressing cover 6 is closed, the light intensity adjustment of the light source 42 described above (Step S1) is not influenced by external light L, and thus an optimum light intensity adjustment value is obtained. Therefore, by irradiating light from the light source 42 onto the document G with the light intensity adjustment value, the same outputs as the outputs of the CIS unit 40 obtained about white and black of the regions 53A and 53B of the reference member 53 are obtained from the white and black portions of the document G.

On the other hand, in the case where it is judged that the document pressing cover 6 is in the open state, the control unit 55 moves the carriage 41 along the platen glass 20 while irradiating light from the light source 42 with the light intensity set value stored in the EEPROM 59, and converts reflected light from the document G into electrical signals by the light-receiving element 44 so as to perform image reading (Step S8). When the document pressing cover 6 is opened, the light intensity adjustment of the light source 42 described above (Step S1) is influenced by external light L. In contrast, as shown in FIG. 10, since the reading start position P1 of the still document reading region 20R is sufficiently spaced apart from the conveyed document reading region 20L, the influence of external light L rarely occurs. Therefore, when light is irradiated from the light source 42 onto the document G with the light intensity adjustment value obtained about the reference member 53, that is, the light intensity adjustment value of the output S1 shown in FIG. 9B, as external light L does not exist, the light intensity received by the light-receiving element 44 is insufficient.

When light is irradiated from the light source 42 onto the document G with the light intensity adjustment value of the output S1, smaller outputs than the outputs of the CIS unit 40 obtained about white and black of the regions 53A and 53B of the reference member 53 are obtained from the white and black portions of the document G, the read image is darkened on the whole. Accordingly, by irradiating light from the light source 42 with the light intensity set value stored in the EEPROM 59, not the light intensity adjustment value influenced by external light, even when the document pressing cover 6 is opened, light can be irradiated from the light source 42 with the light intensity to be obtained when the document pressing cover 6 is closed.

Subsequently, the control unit 55 performs the shading correction on data sequentially output from the CIS unit 40 during the movement of the carriage 41 (Step S9). Specifically, an output signal of the CIS unit 40 is subjected to an analog-to-digital conversion, and the shading correction is performed on the basis of reference data stored in the RAM 58. Regardless of the open/closed state of the document pressing cover 6, with the light intensity adjustment value obtained in the open or closed state, reference data is white level data obtained by irradiating light from the light source 42 about the region 53A of the reference member 53 or black level data obtained by turning off the light source 42 about the region 53B.

When the document pressing cover 6 is closed, the light intensity adjustment value obtained by the light intensity adjustment about the reference member 53 is not influenced by external light L. And then, the acquisition of white level data and black level data about the reference member 53, and image reading of the document G are also performed with no influence of external light L. Therefore, for all operations, the obtained light intensity adjustment value can be used.

Figure 9C:
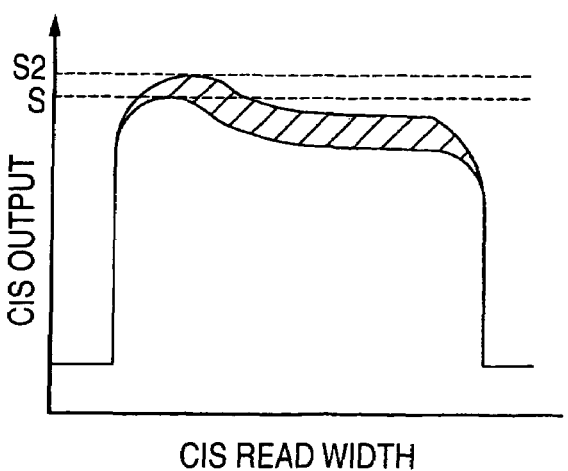
FIG. 9C is a graph showing an output of the CIS unit when a light source is irradiated in a state in which the document pressing cover is opened.

In contrast, when the document pressing corer 6 is opened, the light intensity adjustment value obtained by the light intensity adjustment about the reference member 53 is influenced by external light L. However, the acquisition of white level data and black level data is performed about the same reference member 53 influenced by external light L. Accordingly, if white level data and black level data are acquired by using the light intensity set value, as shown in FIG. 9C, an output corresponding to external light L indicated by a hatching region in FIG. 9C is added to the desired outputs which should be originally obtained about the region 53A of the reference member 53, and thus white level data of an output S2 larger than the output S is acquired.

If the shading correction is performed on the basis of white level data of the output S2, the read image is entirely darkened. Therefore, by irradiating light from the light source 42 with the light intensity adjustment value obtained through the light intensity adjustment about the reference member 53 influenced by external light L and by acquiring white level data about the reference member 53, reference data by an optimum light intensity taking external light L into account can be acquired.

Next, output data of the CIS unit 40 subject to the shading correction is stored in the RAM 58 as image data. Further, when image reading is completed, the control unit 55 returns the carriage 41 to the home position HP to be in the standby state.

As such, according to the scanner unit 2 of the multi function apparatus 1, when the document pressing cover 6 is closed about the document placing table 4, the control unit 55 performs the light intensity adjustment about the reference member 53, and irradiates light from the light source 42 of the CIS unit 40 on the basis of the obtained light intensity adjustment value so as to perform image reading of the document G. Further, image reading of the document G can be performed by the CIS unit 40, without using the light intensity adjustment value influenced by external light L when the document pressing cover 6 is opened. Therefore, the degradation of the read image, such as darkening or blurring, can be prevented.

Incidentally, in this aspect, the light intensity set value is input and set in the EEPROM 59 at the time of manufacturing or shipping, but the light intensity set value is not limited to the previously set value. Specifically, for example, in the operation of the scanner unit 2 shown in FIG. 8, when it is judged that the obtained light intensity adjustment value is in the predetermined range (Step S6), that is, when the document pressing cover 6 is closed about the document placing table 4, the control unit 55 can store the light intensity adjustment value stored in the RAM 58 (Step S2) by the light intensity adjustment performed about the reference member 53 (Step S1) in the EEPROM 59, and can use that as the light intensity adjustment value in subsequent image reading.

Further, other than the image reading operation by the scanner unit 2, for example, when or after power is supplied, the control unit 55 may operate the CIS unit 40 and the carriage 41 at predetermined time intervals and may perform the light intensity adjustment about the reference member 53. And then, when it is judged that the obtained light intensity adjustment value is in the predetermined range, the light intensity adjustment value can be stored in the EEPROM 59 as the light intensity set value and can be used as the light intensity set value in subsequent image reading.

Further, in this aspect, by performing the light intensity adjustment of the light source 42 of the CIS unit 40 about the reference member 53, and by judging whether or not the obtained light intensity adjustment value is in the predetermined range, the external light, that is, the open/closed state of the document pressing cover 6 is judged. Alternatively, by using the CIS unit 40 as the open/closed state detecting unit, the open/closed state of the document pressing cover 6 can be judged on the basis of the read value of the CIS unit 40 obtained by additional operations.

Specifically, the light source 42 of the CIS unit 40 is turned off, and then the reference member 53 is read. When external light L does not enter into the document placing table 4, the read value obtained when the light source 42 is turned off becomes a value close to black level data. On the other hand, when external light L enters, the light-receiving element 44 reads external light L, and thus the read value higher than black level data is obtained. Therefore, an optimum range of the read value is set on the basis of the black signal reference signal output from the CIS unit 40 and, when the obtained read value is out of the predetermined range, it can be judged that the document pressing cover 6 is in the open state.

Further, as an additional operation, by turning off the light source 42 of the CIS unit 40, and by reading the left region 53A and the central region 53B of the reference member 53, the open/closed state of the document pressing cover 6 can be judged from the difference between the read values. When external light L does not enter into the document placing table 4, both read values obtained when the light source 42 is turned off are the same value close to black level data, regardless of the white region 53A and the black region 53B. When external light L enters, the difference between both read values occurs by a difference in reflectance. Therefore, when the optimum threshold value is set about the difference between the read values, and the difference between the read values is the threshold value or more, it can be judged that the document pressing cover 6 is in the open state.

Further, as the open/closed state detecting unit, instead of the CIS unit 40, a magnetic sensor or an optical sensor may be used to directly detect the open/closed state of the document pressing cover 6.

Further, in this aspect, as the image reading unit, the CIS unit 40 which is the contact image sensor is used. Alternatively, as the image reading unit, instead of the contact image sensor, for example, a CCD image sensor for a reduced optical system can be used.

As was described, in the image reading apparatus according to the aspect of the invention, the control unit may use a prescribed light intensity value as the light intensity set value.

The setup of the light intensity adjustment value may be performed at the time of manufacturing or shipping the image reading apparatus. Further, as the light intensity set value, the light intensity adjustment value obtained by the light intensity adjustment performed when the document pressing member is closed can be used.

Further, in the image reading apparatus according to the aspect of the invention, when the open/closed state detecting unit detects the closed state of the document pressing member, the control unit may store a light intensity adjustment value obtained by performing a light intensity adjustment of the light source of the image reading unit about the reference member, and may set the light intensity adjustment value as the light intensity set value.

As the light intensity set value, for example, the light intensity adjustment value obtained at the time of previous image reading or the light intensity adjustment value obtained by performing the light intensity adjustment separately from image reading by the image reading unit at the time of the power supply when the document pressing member is closed.

Further, in the image reading apparatus according to the aspect of the invention, the open/closed state detecting unit may detect external light entering into the document placing table so as to detect the open/closed state of the document placing member.

The detection of external light can be performed by the image reading unit. Therefore, a sensor for detecting the open/closed state of the document pressing member does not need to be separately provided, and thus the reduction in size and cost can be realized.

Further, in the image reading apparatus according to the aspect of the invention, when the light intensity adjustment value obtained by causing the image reading unit to perform the light intensity adjustment about the reference member is out of a predetermined range, the open/closed state detecting unit may detect that the document pressing member is in the open state.

When the document pressing member is opened about the document placing table, external light enters into the document placing table, and also external light has influence on the reference member. If the light intensity adjustment of the light source of the image reading unit is performed about the reference member, the obtained light intensity adjustment value becomes smaller than the light intensity adjustment value when the document pressing member is closed. Therefore, if the obtained light intensity adjustment value is out of the predetermined range, according to how much external light enters into the document placing table, it can be detected that the document pressing member is opened. Further, the predetermined range can be determined, for example, on the basis of the light intensity set value.

Further, in the image reading apparatus according to the aspect of the invention, if a read value when the image reading unit turns off the light source and reads the reference member is out of a predetermined range, the open/closed state detecting unit may detect that the document pressing member is in the open state.

When the document pressing member is opened about the document placing table, external light enters into the document placing table, and also external light has influence on the reference member. When the luminance reference of the image reading unit is acquired when the light source is turned off about the reference member, that is, when a black level reference is acquired, the obtained read value becomes larger by the amount of external light than the read value when the document pressing member is closed. Therefore, if the obtained read value is out of the predetermined range, according to how much external light enters into the document placing table, it can be detected that the document pressing member is opened. Further, the predetermined range can be determined, for example, on the basis of a black level reference signal output from a device used as the image reading unit.

Further, in the image reading apparatus according to the aspect of the invention, the reference member may have white and black portions in a movement direction of the scanning unit, and, if a difference between read values when the image reading unit turns off the light source and reads the white and black portions of the reference member is a predetermined threshold value or more, the open/closed state detecting unit may detect that the document pressing member is in the open state.

When the document pressing member is opened about the document placing table, external light enters into the document placing table, and also external light has influence on the reference member. The white and black portions of the reference member are individually read when the light source is turned off about the reference member. When the document pressing member is closed, the read values are the same. However, when the influence of external light exists, a difference in reflectance of external light occurs, and a difference between the read values occurs. Therefore, if the difference between the obtained read values is the predetermined threshold value or more, according to how much external light enters into the document placing table, it can be detected that the document pressing member is opened.

Further, in the image reading apparatus according to the aspect of the invention, the control unit may irradiate light from the light source onto the reference member and may acquire a luminance reference of the image reading unit on the basis of the light intensity adjustment value obtained by causing the image reading unit to perform the light intensity adjustment of the light source about the reference member.

When the document pressing member is opened about the document placing table, external light enters into the document placing table, and also external light has influence on the reference member. However, since the light intensity adjustment and the acquisition of the luminance reference are performed about the same reference member, the influence of external light is the same. Therefore, by acquiring the luminance reference of the image reading unit about the same reference member with the actual light intensity adjustment value about the reference member influenced by external light, the luminance reference according to an optimum light intensity in view of external light can be acquired.

Further, in the image reading apparatus according to the aspect of the invention, the reference member may be disposed between the transparent member and a dividing member which is disposed in a region where the transparent member is exposed as an outer surface of the document placing table and divides the region. Preferably, the dividing member divides the region where the transparent member is exposed as the outer surface of the document placing table into a conveyed document reading region where the image reading unit reads the image of the document being conveyed in a predetermined direction and a still document reading region where the image reading unit reads the image of the document placed on the transparent member.

Accordingly, a space for providing the reference member in a region other than the region where the transparent member is exposed as the outer surface of the document placing table does not need to be ensured. Therefore, the document placing table can be reduced in size.

Further, in the image reading apparatus according to the aspect of the invention, the document pressing member may be provided with an automatic document conveying mechanism which conveys the document loaded on a paper supply tray to the conveyed document reading region and discharges the document to a paper discharge tray, and, at a surface of the dividing member close to the document pressing member, a guide surface which guides the document before reading to the conveyed document reading region may be formed.

By providing the guide surface in the dividing member, the document can be smoothly conveyed to the conveyed document reading region and, by realizing a common use of parts, a reduction in size and in cost can be realized. Further, the guide surface guides the document before reading to the conveyed document reading region, and thus the lowermost portion of the guide surface does not need to be dented from the document placing surface of the transparent member. Therefore, the transparent member can be formed of one member extending over the conveyed document reading region and the still document reading region.

Further, in the image reading apparatus according to the aspect of the invention, the image reading unit may be a contact image sensor. In the contact image sensor, as the light source, a light source having low illuminance, such as a light-emitting diode or the like, may be adopted, and, when the light source having low illuminance is used, it tends to be influenced by external light. Therefore, when the image reading unit is the contact image sensor, the above-described advantages are markedly exerted.

Hereinafter, another aspect of the present invention will be described with reference to FIGS. 11 to 15. Incidentally, elements in this aspect which are like or equivalent to those of the first aspect described above have been given the same reference numerals. As shown in FIG. 12, on the lower surface of the dividing member 51, a first reference member 53 is provided between the dividing member 51 and the platen glass 20. The first reference member 53 serves as a luminance reference of the CIS unit 40. Specifically, the first reference member 53 is a thin-film stripe member which substantially covers the entire lower surface of the dividing member 51. As shown in FIG. 6, three regions are provided in a sub-scanning direction of the CIS unit 40, that is, in a horizontal direction in the drawing. A left region 53A is a white colored region, and is used for a light intensity adjustment or the acquisition of white level data of the CIS unit 40. A central region 53B is a black colored region, and is used for the acquisition of black level data of the CIS unit 40. Further, a boundary between the left region 53A and the central region 53B serves as a reference of the sub-scanning direction of the CIS unit 40. A right region 53C is a region, a depthwise center of which is colored white and both ends thereof are colored black. The right region 53C serves as a reference of a main scanning direction of the CIS unit 40. The first reference member 53 is provided between the dividing member 51 and the platen glass 20 such that each region is in the same direction as the extension direction of the CIS unit 40.

As such, by providing the first reference member 53 on the lower surface of the dividing member 51, a reading position of the first reference member 53 can approximate to a reading position of the document, that is, reading start positions of the conveyed document reading region 20L and the still document reading region 20R. A movement distance of the carriage 41 required for reading the document after the light intensity adjustment or the acquisition of white level data about the first reference member can be shortened. Further, by allowing the dividing member 51 to substantially have the same width as that of the first reference member 53, the width of the dividing member 51 is made small, and thus the region of the platen glass 20 exposed at the upper surface of the document placing table 4 can be made small. Accordingly, the area of the upper surface of the document placing table 4 can be made small, and thus the scanner unit 2 can be reduced in size.

Figure 11:
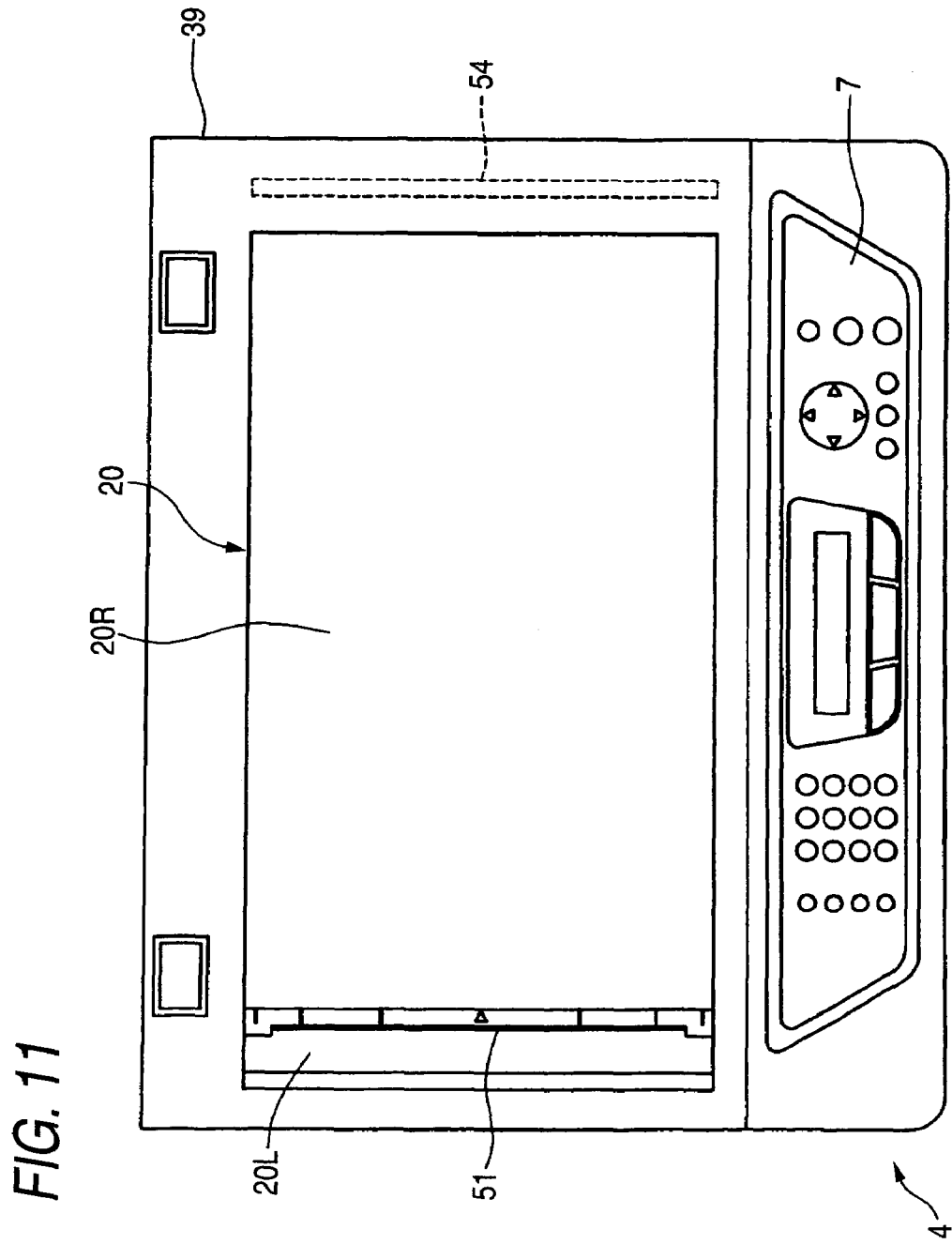
FIG. 11 is a plan view showing the configuration of a document placing table according to another aspect of the invention.
Figure 12:
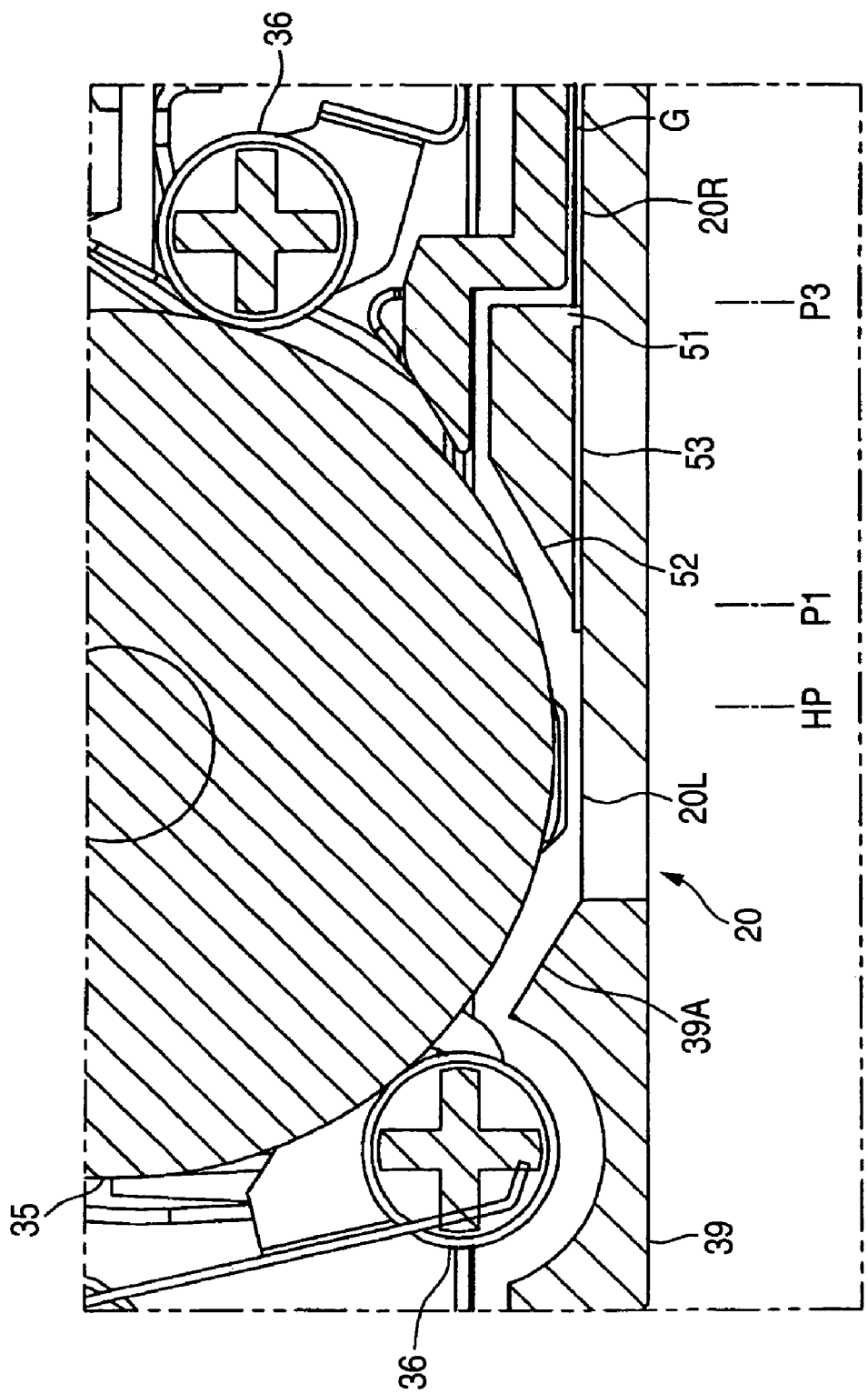
FIG. 12 is an enlarged cross-sectional view showing the peripheral configuration of a first reference member.
Figure 13:
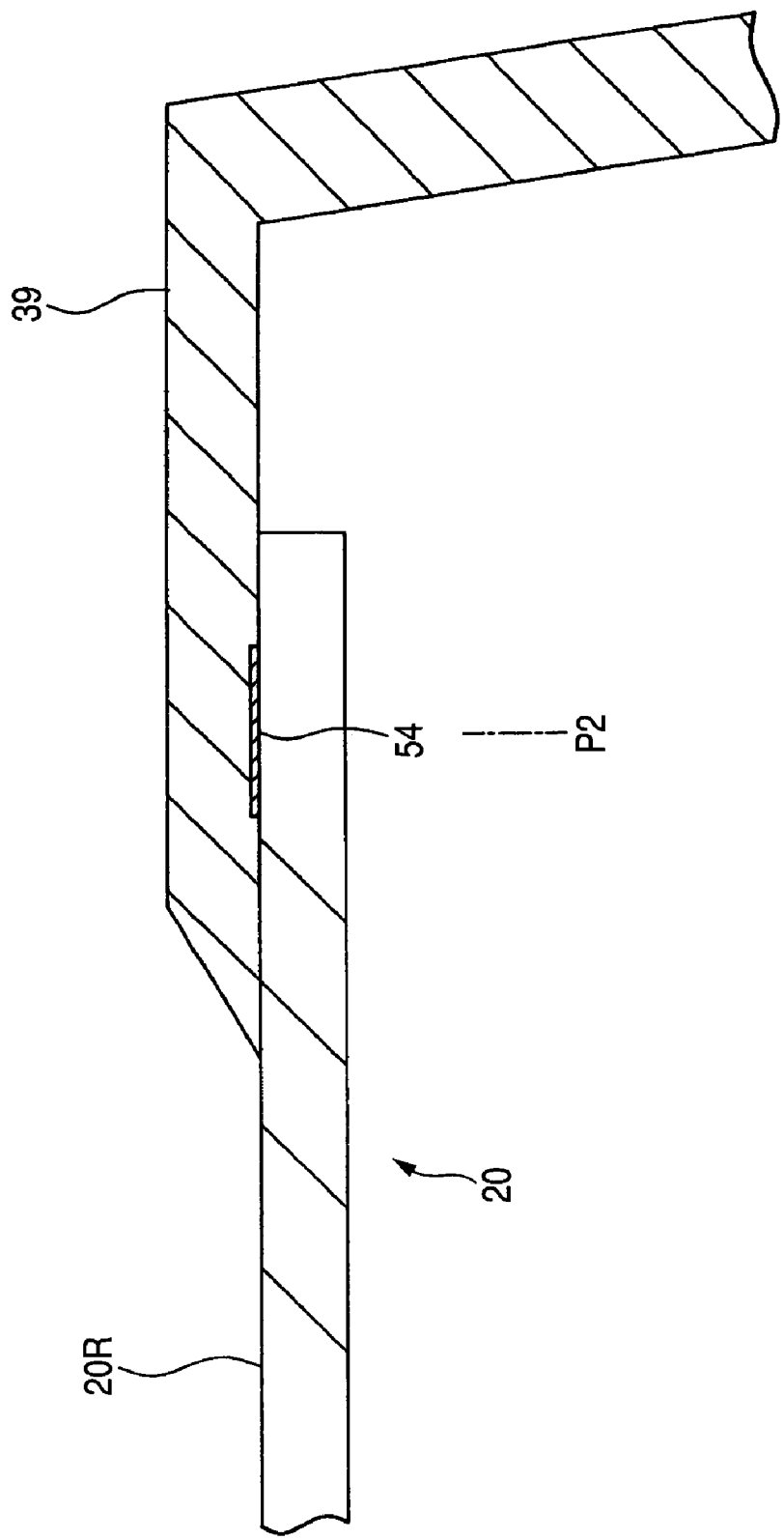
FIG. 13 is an enlarged cross-sectional view showing the peripheral configuration of a second reference member.
Figure 14:
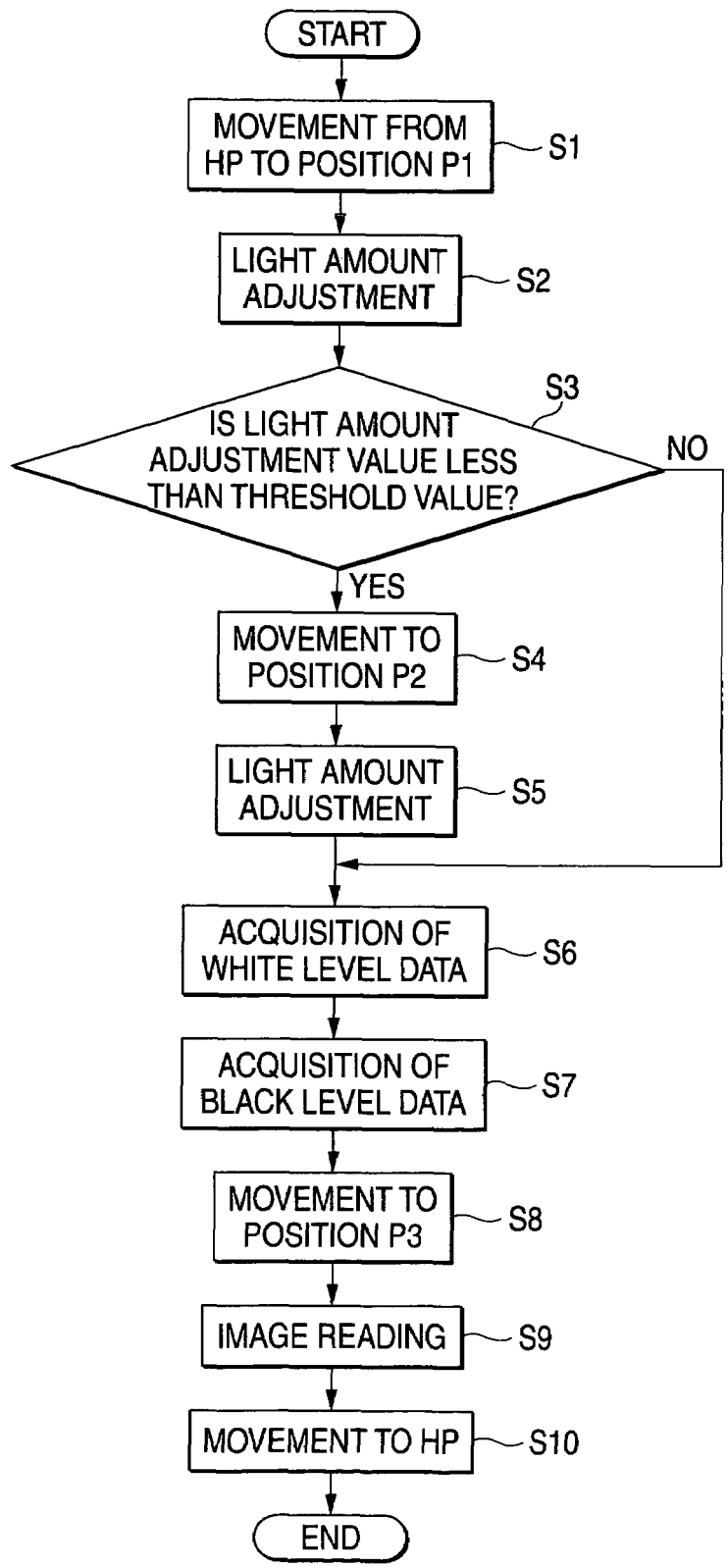
FIG. 14 is a flowchart showing an output adjustment of a CIS unit.

Further, as shown in FIGS. 11 and 13, in a region other than the region where the platen glass 20 is exposed as the outer surface of the document placing table 4, at an end of the sub-scanning direction of the CIS unit 40 on a right side in the widthwise direction of the document placing table 4, a second reference member 54 is provided. Incidentally, in FIG. 13, the document pressing cover 6 is not shown. Like the first reference member 53, the second reference member 54 also serves as a luminance reference of the CIS unit 40. Specifically, the second reference member 54 is a thin-film stripe member which substantially crosses in the main scanning direction of the CIS unit 40, and is provided between the casing 39 of the document placing table 4 and the platen glass 20. As described above, the opening is provided on the upper surface of the casing 39 so as to expose the platen glass 20, and the second reference member 54 is disposed to be sufficiently deeper than the edge of the opening. The position is set to an extent that external light entering from the opening does not have influence on the second reference member 54. Specifically, the position may be set to be deeper than the edge of the opening by about several centimeters. Further, the platen glass 20 is larger than the opening of the casing 39, and extends to the inner surface of the upper surface of the casing 39.

As such, by providing the second reference member 54 between the casing 39 and the platen glass 20, the second reference member 54 can be disposed in the same reading environment as the document, that is, in a state in which the upper side on the platen glass 20 is shielded. Further, by disposing the second reference member 54 on the inner surface of the casing 39, an influence of external light on the second reference member 52 can be reliably prevented, without increasing the size of the document placing table 4. The entire region of the second reference member 54 is colored white, and thus the second reference member 54 is used for the light intensity adjustment or the acquisition of white level data and black level data of the CIS unit 40.

FIG. 7 shows the configuration of a control unit 55 of the multi function apparatus 1. The control unit 55 controls the entire operation of the multi function apparatus 1 including the scanner unit 2 and the printer unit 3. However, in this aspect, the parts of the printer unit 3 do not need to be described in detail, and thus the parts of the printer unit 3 are not shown in the drawing. As shown in FIG. 7, the control unit 55 is a micro computer primarily having a CPU 56, a ROM 57, a RAM 58, and an EEPROM (Electrically Erasable and Programmable ROM) 59, and is connected to an ASIC (Application Specific Integrated Circuit) 61 through a bus 60.

The ROM 57 stores programs for controlling various operations of the multi function apparatus 1 and the like. The RAM 58 is used as a storage area or a work area for temporarily storing various kinds of data used when the CPU 56 executes the programs.

According to the command from the CPU 56, the ASIC 61 generates a phase excitation signal or the like used for applying power to the conveying (LF) motor 62 and sends the signal to a driving circuit 63 of the conveying motor 62. Power is applied to the conveying motor 62 by means of the driving signal through the driving circuit 63, and thus the rotation of the conveying motor 62 is controlled.

The driving circuit 63 drives the conveying motor 62 connected to the pick-up roller 31, the separating roller 33, and the conveying roller 35. The driving circuit 63 receives the output signal from the ASIC 61 and forms an electrical signal for rotating the conveying motor 62. The conveying motor 62 rotates by the electrical signal, and rotation force of the conveying motor 62 is applied to the separating roller 33 and the conveying roller 35 through a known driving mechanism having gears or driving shafts.

Similarly, according to the command from the CPU 56, the ASIC 61 generates a phase excitation signal or the like used for applying power to the carriage (CR) motor 64 and sends the signal to a driving circuit 65 of the carriage motor 64. Power is applied to the carriage motor 64 by means of the driving signal through the driving circuit 65, and thus the rotation of the carriage motor 64 is controlled.

The driving circuit 65 drives the carriage motor 64 of the belt driving mechanism connected to the carriage 41. The driving circuit 65 receives the output signal from the ASIC 61 and forms an electrical signal for rotating the carriage motor 64. The carriage motor 64 rotates by the electrical signal, and rotation force is applied to the carriage 41 through the known belt driving mechanism. As a result, the carriage 41 is scanned.

Further, a lead sensor 66 which detects the document in the conveying path 26, a rotary sensor 67 which is provided to detect the rotation amount of the separating roller 33 or the conveying roller 35, and a linear encoder 68 which detects the movement amount of the carriage 41 are connected to the ASIC 61.

Further, the CIS unit 40 which performs image reading of the document to be conveyed via the conveying path 26 is connected to the ASIC 61. On the basis of a control program stored in the ROM 57, the light intensity adjustment or the acquisition of white level data, and image reading are performed. Further, in this aspect, the CIS unit 40 also functions as an open/closed state detecting unit which detects an open/closed state of the document pressing cover 6. Specifically, by opening the document pressing cover 6, the platen glass 20 at the upper surface of the document placing table 4 is exposed, and external light enters into the document placing table 4 through the platen glass 20. On the other hand, when the document pressing cover 6 is closed, the platen glass 20 is covered with the document pressing cover 6, and thus external light is shielded and does not enter into the document placing table 4.

The CIS unit 40 is provided inside the document placing table 4. Accordingly, as described below, when the CIS unit 40 performs the light intensity adjustment about the first reference member 53, the open/closed state of the document pressing cover 6 can be judged based on whether or not the light intensity adjustment value is less than a predetermined threshold value. That is, if external light enters, even when the light intensity of the light source 42 of the CIS unit 40 is small by the amount of external light, a predetermined output is obtained, and thus the light intensity adjustment value becomes small. Therefore, if the light intensity adjustment value is less than the predetermined threshold value, it can be judged that the document pressing cover 6 is opened. The open/closed state detecting unit has the CPU 56, the ROM 57, the RAM 58, the EEPROM 59, and the CIS unit 40.

As such, by judging the open/closed state of the document pressing cover 6 on the basis of the detection of external light by the CIS unit 40, a sensor for detecting the open/closed state of the document pressing cover 6 does not need to be separately provided, and thus the scanner unit 2 can be reduced in size and cost. Moreover, the CIS unit 40 may continuously operate so as to detect external light while the power supply of the multi function apparatus 1 is turned on. In this case, when the CIS unit 40 detects external light, that is, when the output of the CIS unit 40 is the predetermined threshold value or more, it can be judged that the document pressing cover 6 is in the open state. Further, when the output is less than the predetermined threshold value, it can be judged that the document pressing cover 6 is in the closed state.

In addition, the operating panel 7 which performs the operation instruction of the multi function apparatus 1, the slot portion 8 into which various small memory cards are inserted, a parallel interface 69 and a USB interface 70 which perform data transmission and reception with an external apparatus such as a personal computer through a parallel cable or a USB cable, and an NCU (Network Control Unit) 71 or a MODEM 72 which implements a facsimile function are connected to the ASIC 61.

Hereinafter, the operation of the scanner unit 2 will be described.

When the scanner unit 2 is used as the FBS, the document pressing cover 6 is opened, and the document G is placed on the still document reading region 20R of the platen glass 20. And then, the document pressing cover 6 is closed, and the document G is fixed onto the platen glass 20. Subsequently, by pressing a start button of the operating panel 7, the control unit 55 moves the carriage 41 along the platen glass 20, the image of the document G placed on the still document reading region 20R of the platen glass 20 is read by the CIS unit 40 during the movement.

On the other hand, when the ADF 5 is used, the document pressing cover 6 is set to be in the closed state about the document placing table 4. And then, the document G to be read is placed on the paper supply tray 22. The document G may have one or more sheets. For example, when image reading of plural documents G having the same size is performed, the documents G are superimposed and arranged, and one ends thereof are inserted from the paper supply tray 22 into the suction chute portion 29.

Next, when the start button of the operating panel 7 is pressed, the control unit 55 drives the motor so as to rotate the pick-up roller 31, the separating roller 33, and the conveying roller 35 with a predetermined timing. And then, the documents G are separated and sent to the conveying path 26 one by one from the lowermost document G, to which rotation force of the pick-up roller 31 and the separating roller 33 is directly applied. The supplied document G is guided to the conveying path 26 and conveyed to the conveyed document reading region 20L, and then image reading of the document G is performed by the CIS unit 40 which tables still below the conveyed document reading region 20L. Next, after image reading is completed, the document G is discharged from the paper discharge chute portion 38 to the paper discharge tray 23.

For image reading by the scanner unit 2, before the CIS unit 40 starts image reading of the document G, the light intensity adjustment of the light source 42 and the acquisition of white level data and black level data are performed as the output adjustment of the CIS unit 40.

The detailed description will be given with reference to FIGS. 12, 13, 14, and 15. First, the control unit 55 moves the carriage 41 to a home position HP (standby position). The home position HP is below the conveyed document reading region 20L. The home position HP is recognized by the control unit 55 with the boundary between the left region 53A and the central region 53B of the first reference member 53 as a mark position. And then, prior to image reading, the carriage 41 is moved below the first reference member 53, that is, to a position P1 in FIG. 12 (Step S1). The position P1 is a position corresponding to the left region 53A of the first reference member 53. As such, by setting the standby position of the CIS unit 40 with the periphery of the first reference member 53 as the home position HP, the movement distance of the carriage 41 can be shortened until the light intensity adjustment is performed about the first reference member 53, and the image reading operation can be performed at high speed.

Next, the control unit 55 performs the light intensity adjustment of the light source 42 in the CIS unit 40 about the first reference member 53. Specifically, light is initially irradiated onto the region 53A of the first reference member 53 from the light source 42 with a sufficiently small light intensity. In this case, reflected light from the region 53A becomes small, and thus the output from the light-receiving element 44 of the CIS unit 40 is small. And then, the light intensity of the light source 42 is gradually increased until the output of the light-receiving element 44 reaches a desired value, and the light intensity when the output reaches the desired value is stored in the RAM 58 as the light intensity adjustment value.

Subsequently, the obtained light intensity adjustment value is compared with a prescribed threshold value (Step S3). The threshold value is determined on the basis of the light intensity adjustment value to be obtained when the document pressing cover 6 is closed and the light intensity adjustment is performed. Specifically, for example, at the time of the shipment of the multi function apparatus 1, the threshold value can be set by storing the light intensity adjustment value set in the EEPROM 59 as the tableard light intensity adjustment value or the light intensity adjustment value obtained in the previous light intensity adjustment in the EEPROM 59, and by multiplying the light intensity adjustment value by a predetermined coefficient of 0.8 or the like.

That is, when the coefficient is 0.8 and the light intensity adjustment value is 80 percent or more of the light intensity adjustment value to be obtained when the document pressing cover 6 is closed and the light intensity adjustment is performed, the control unit 55 judges that the document pressing cover 6 is in the closed state. As shown in FIG. 12, when the document pressing cover 6 is in the closed state, the conveyed document reading region 20L is covered with the conveying roller 35 or the like, and also the entire region of the platen glass 20 is covered with the document pressing cover 6. Accordingly, there is no case in which external light enters into the periphery of the first reference member 53. Therefore, when the light intensity adjustment is performed about the first reference member 53, the same value as the tableard light intensity adjustment value or the previous light intensity adjustment value is obtained. As a result, in view of stability of the light source 42 or the light-receiving element 44 or the like, the value in a predetermined range from the tableard light intensity adjustment value is obtained.

Figure 15:
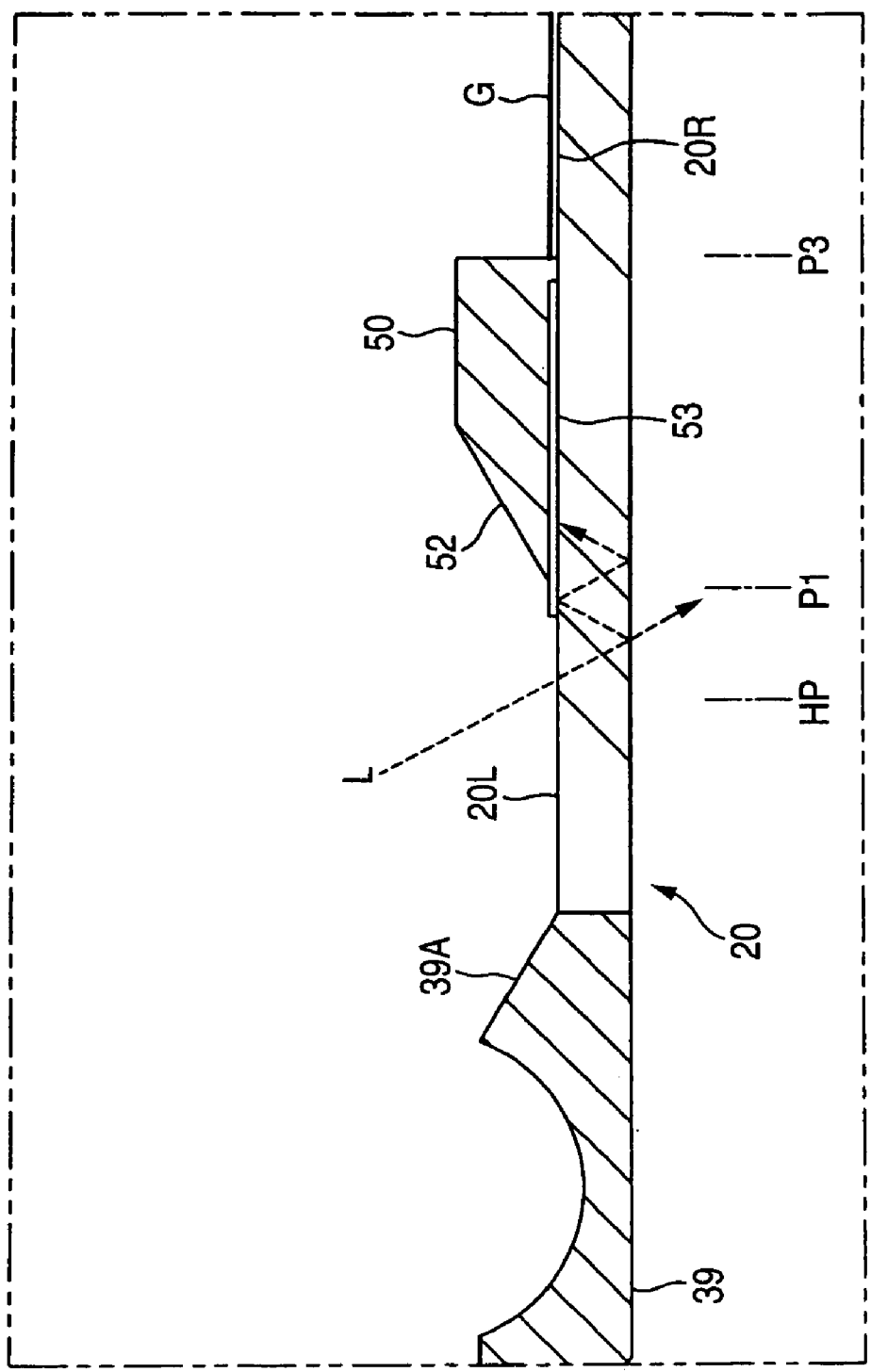
FIG. 15 is an enlarged cross-sectional view showing the peripheral configuration of the first reference member in a state in which a document pressing cover is closed.
Figure 16:
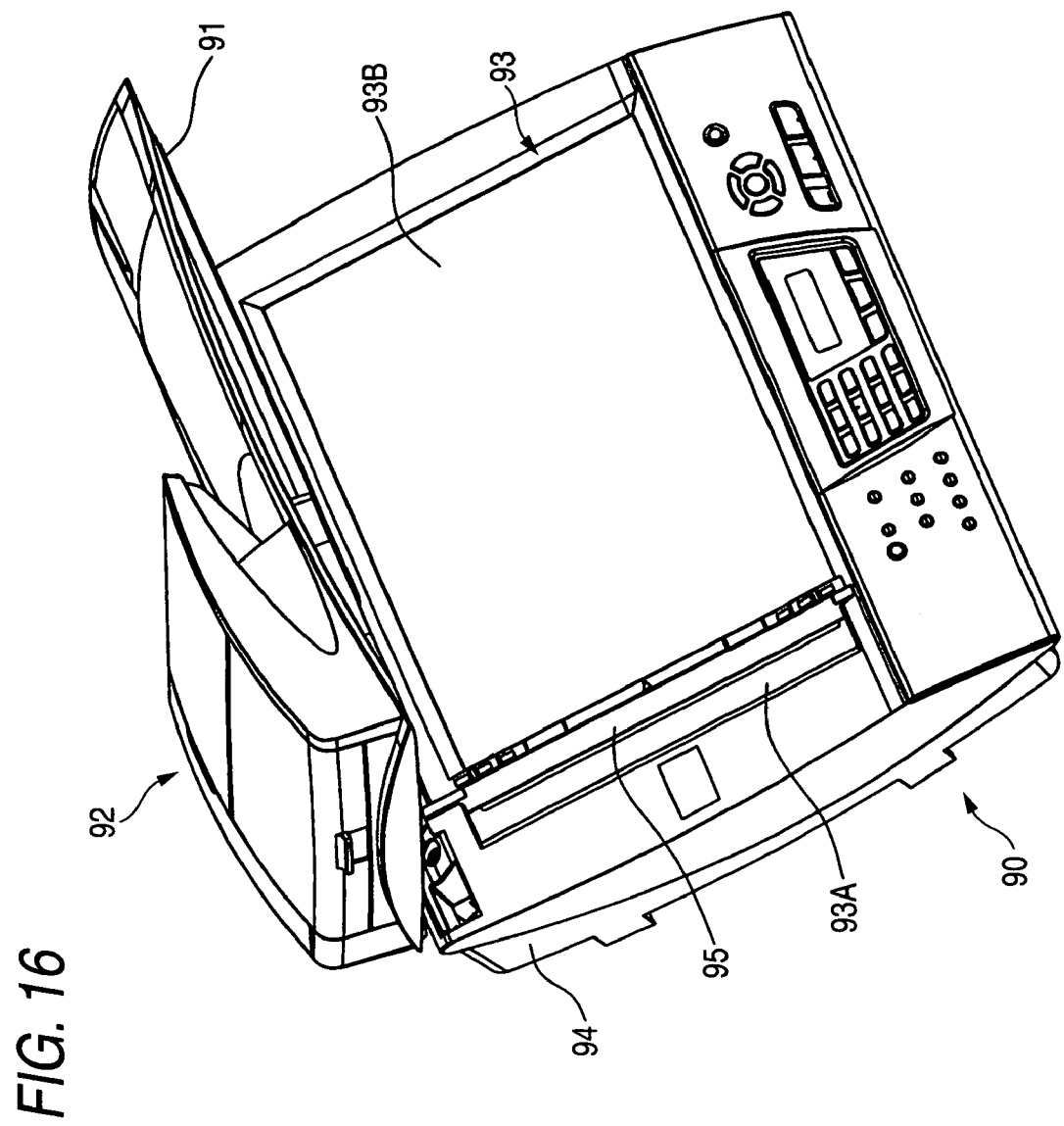
FIG. 16 is a perspective view showing the schematic configuration of a conventional image reading device.

On the other hand, when the scanner unit 2 is used as the FBS, a thick document such as a book or the like is placed on the platen glass 20, the document pressing cover 6 may not be completely closed. Further, in case of reading a part of a document having a size larger than the still document reading region 20R of the platen glass 20, it is assumed that, in order to confirm a reading place, image reading is performed with the document pressing cover 6 unclosed. As shown in FIG. 15, when the document pressing cover 6 is in the open state, since the conveyed document reading region 20L is exposed, external light enters from the conveyed document reading region 20L into the document placing table 4.

External light is reflected at members inside the document placing table 4, enters into the first reference member 53 while being reflected within the thickness of the platen glass 20, or enters into the CIS unit 40 disposed at the position P1. In particular, as shown in FIG. 2, in the CIS unit 40, the light-receiving element 44 is provided upward, and thus external light L entering from the upper surface of the CIS unit 40 into the CIS unit 40 is likely to have influence on the output of the light-receiving element 44. Therefore, when the light intensity adjustment is performed about the first reference member 53 in a state in which external light L enters, even when the amount of light irradiated from the light source 42 is small by the light intensity of external light L, the light-receiving element 44 receives the light intensity which is the sum of the amount of reflected light and external light L, and thus a desired output value is obtained. As a result, the light source 42 has a smaller light intensity adjustment value by the amount of external light. Accordingly, when the coefficient is 0.8 and the light intensity adjustment value is less than 80 percent of the light intensity adjustment value to be obtained when the document pressing cover 6 is closed and the light intensity adjustment is performed, the control unit 55 judges that the document pressing cover 6 is in the open state.

As the comparison result of the obtained light intensity adjustment value and the prescribed threshold value, when it is less than the threshold value, the control unit 55 moves the carriage 41 to a position P2 (Step S4). As shown in FIG. 13, the position P2 is a position corresponding to the second reference member 54. As shown in FIG. 13, the second reference member 54 is provided to be sufficiently deeper than the edge of the opening which is opened in the casing 39 of the document placing table 4 in order to expose the platen glass 20, and the upper side and both sides of the second reference member 54 are covered with the casing 39. Therefore, the light intensity adjustment can be performed about the second reference member with no influence by external light L, and thus the optimum light intensity adjustment value can be obtained with no influence of external light L (Step S5).

Next, by using the light intensity adjustment value obtained about the second reference member 54, white level data and black level data are acquired about the second reference member 54 (Steps S6 and S7). Specifically, light is irradiated from the light source 42 of the CIS unit 40 with the light intensity adjustment value about the second reference member 54. And then, reflected light from the second reference member 54 is converted into the electrical signal by the light-receiving element 44, and the output is stored in the RAM 58 as white level data. The acquisition of white level data may be performed about the second reference member 54 several times, and the average may be used. Further, the acquisition of white level data may be performed while moving the carriage 41 within a range of the second reference member 54.

After white level data is acquired, the control unit 55 stores the output of the light-receiving element 44, which is obtained about the second reference member 54 when the light source 42 is turned off, in the RAM 58 as black level data. Similarly, the acquisition of black level data may be performed several times or may be performed while moving the carriage 41 within the range of the second reference member 54. Further, the acquisition of white level data and the acquisition of black level data can be reversed. White level data and black level data obtained in such a manner are used as reference data for the shading correction at the time of image reading.

Subsequently, the control unit 55 moves the carriage 41 to a position P3 which is a reading start position in the still document reading region 20R (Step S8). And then, the control unit 55 moves the carriage 41 along the platen glass 20 while irradiating light from the light source 42 with the light intensity adjustment value obtained about the second reference member 54. As shown in FIG. 15, since the reading start position P3 of the still document reading region 20R is sufficiently spaced apart from the conveyed document reading region 20L, an influence of external light L rarely occurs. Therefore, the light intensity adjustment value obtained about the second reference member 54 becomes the optimum light intensity of light to be irradiated from the light source 42 onto the document G.

Next, during the movement of the carriage 41, reflected light from the document G placed on the still document reading region 20R of the platen glass 20 by the CIS unit 40 is sequentially converted into the electrical signals by the light-receiving element 44, and image data of the document G is obtained (Step S9). Image data output from the CIS unit 40 is stored in the RAM 58, and the shading correction is performed on the basis of white level data and black level data. Since white level data and black level data are obtained about the second reference member 54, the optimum shading correction is performed with no influence of external light L. Further, when image reading is completed, the control unit 55 returns the carriage 41 to the home position HP to be in the standby state (Step S10).

On the other hand, as the comparison result of the obtained light intensity adjustment value and the prescribed threshold value, when it is the threshold value or more, white level data and black level data are obtained about the first reference member 53 (Steps S6 and S7). Specifically, the control unit 55 drives the CR motor 64 so as to move the carriage 41 to the position P1, and irradiates light from the light source 42 of the CIS unit 40 onto the left region 53A of the first reference member 53 with the light intensity adjustment value obtained about the first reference member 53. And then, reflected light from the region 53A is converted into the electrical signals by the light-receiving element 44, and the output is stored in the RAM 58 as white level data. The acquisition of white level data may be performed about the region 53A several times and the average may be used. Further, the acquisition of white level data may be performed while moving the carriage 41 within the range of the range 53A.

After white level data is acquired, the control unit 55 drives the CR motor 54 so as to move the carriage 41 to a position corresponding to the central region 53B of the first reference member 53. And then, the output of the light-receiving element 44 obtained in a state in which the light source 42 is turned off is stored in the RAM 58 as black level data. Similarly, the acquisition of black level data may be performed several times or may be performed while moving the carriage 41 within the range of the region 53B. Further, the acquisition of white level data and the acquisition of black level data can be reversed. White level data and black level data obtained in such a manner are used as reference data for the shading correction at the time of image reading. As such, when the document pressing cover 6 is closed and the influence of external light L does not exist, the light intensity adjustment of the light source 42 and the acquisition of white level data and black level data are performed about the first reference member 53 close to the home position HP and the image reading start position. Accordingly, the movement distance of the carriage 41 is shortened, and time required for image reading is reduced.

Subsequently, the control unit 55 moves the carriage 41 to the position P3 which is the reading start position in the still document reading region 20R (Step S8). And then, the control unit 55 moves the carriage 41 along the platen glass 20 while irradiating light from the light source 42 with the light intensity adjustment value obtained about the first reference member 53. During the movement, the image of the document placed on the still document reading region 20R of the platen glass 20 by the CIS unit 40 is read (Step S9). Image data output from the CIS unit 40 is stored in the RAM 58, and the shading correction is performed on the basis of white level data and black level data. Further, after image reading is completed, the control unit 55 returns the carriage 41 to the home position HP to be in the standby state (Step S10).

As such, according to the scanner unit 2 of the multi function apparatus 1, when the document pressing cover 6 is closed about the document placing table 4, the output adjustment of the CIS unit 40 about the first reference member 53 is performed. Further, when the document pressing cover 6 is opened about the document placing table 4, the output adjustment about the second reference member 54 is performed. Accordingly, even when the document pressing cover 6 is opened, the output adjustment of the CIS unit 40 can be accurately performed with no influenced of external light L. Therefore, at the time of the output adjustment, the read image can be prevented from being degraded due to the influence of external light L.

Moreover, in this aspect, by performing the light intensity adjustment of the light source 42 in the CIS unit 40 about the first reference member 53, and by comparing the obtained light intensity adjustment value with the threshold value, the external light, that is, the open/closed state of the document pressing cover 6 is judged. Alternatively, by using the CIS unit 40 as the open/closed state detecting unit of the invention, the open/closed state of the document pressing cover 6 can be judged on the basis of the read value of the CIS unit obtained by an additional operation. Specifically, the light source 42 of the CIS unit 40 is turned off, and the first reference member 53 is read. When external light L does not enter into the document placing table 4, the read value obtained when the light source 42 is turned off becomes a value close to black level data. On the other hand, when external light L enters, the light-receiving element 44 reads external light L, and thus the read value higher than black level data is obtained. Therefore, when an optimum threshold value about the read value is set and the obtained read value is the threshold value or more, it can be judged that the document pressing cover 6 is in the open state.

Further, as an additional operation, by turning off the light source 42 of the CIS unit 40, and by reading the left region 53A and the central region 53B of the first reference member 53, the open/closed state of the document pressing cover 6 can be judged from the difference between the read values. When external light L does not enter into the document placing table 4, both read values obtained when the light source 42 is turned off are the same value close to black level data, regardless of the white region 53A and the black region 53B. When external light L enters, the difference between both read values occurs by a difference in reflectance. Therefore, when the optimum threshold value is set about the difference between the read values, and the difference between the read values is the threshold value or more, it can be judged that the document pressing cover 6 is in the open state.

Further, as the open/closed state detecting unit, instead of the CIS unit 40, a magnetic sensor or an optical sensor may be used to directly detect the open/closed state of the document pressing cover 6.

Further, in this aspect, as the image reading unit, the CIS unit 40 which is the contact image sensor is used. Alternatively, as the image reading unit, instead of the contact image sensor, for example, a CCD image sensor for a reduced optical system can be used.

Further, the output adjustment of the image reading unit does not necessarily mean all of the light intensity adjustment of the light source, and the acquisition of white level data and black level data. For example, white level data or black level data of a CIS image sensor or a CCD image sensor may be acquired with a predetermined light intensity, without performing the light intensity adjustment of the light source. When white level data or black level data is acquired, if the influence of external light exists, the shading correction is performed with a larger output by the amount of external light as the reference of a white level or black level. Accordingly, if the image of the document G with no influence of external light is read, and the shading correction is performed, the read image is dark, and contrast is low. Therefore, by applying the aspect of the invention when white level data or black level data is acquired, reference data of the optimum shading correction can be acquired with no influence of external light.

As was described, in the image reading apparatus according to the aspect of the invention, the first reference member may be disposed between the transparent member and a dividing member which is disposed in the region where the transparent member is exposed as the outer surface of the document placing table and divides the region. Preferably, the dividing member divides the region where the transparent member is exposed as the outer surface of the document placing table into a conveyed document reading region where the image reading unit reads the image of the document being conveyed in a predetermined direction and a still document reading region where the image reading unit reads the image of the document placed on the transparent member.

Accordingly, a space for disposing the first reference member in a region other than the region where the transparent member is exposed as the outer surface of the document placing table does not need to be ensured. Therefore, the document placing table can be reduced in size.

Further, in the image reading apparatus according to the aspect of the invention, the document pressing member may be provided with an automatic document conveying mechanism which conveys the document loaded on a paper supply tray to the conveyed document reading region and discharges the document to a paper discharge tray. Further, at a surface of the dividing member close to the document pressing member, a guide surface which guides the document before reading to the conveyed document reading region may be formed.

By providing the guide surface in the dividing member, the document can be smoothly conveyed to the conveyed document reading region and, by realizing a common use of parts, a reduction in size and in cost can be realized. Further, the guide surface guides the document before reading to the conveyed document reading region, and thus the lowermost portion of the guide surface does not need to be dented from the document placing surface of the transparent member. Therefore, the transparent member can be formed of one member extending over the conveyed document reading region and the still document reading region.

Further, in the image reading apparatus according to the aspect of the invention, the second reference member may be disposed on an inner surface side of the document placing table. Preferably, the second reference member is disposed at an end position of a movable range of the scanning unit. More preferably, the second reference member is disposed at the end position of the movable range close to the still document reading region.

Accordingly, the second reference member can be set in the same reading environment as the document and an influence of external light on the second reference member can be prevented, without increasing the size of the document placing table.

Further, in the image reading apparatus according to the aspect of the invention, the image reading unit may set the periphery of the first reference member at a standby position.

If the document pressing member is closed about the document placing table, after the output adjustment of the image reading unit about the first reference member, the control unit performs image reading. Therefore, by setting the periphery of the first reference member subject to the output adjustment in a normal image reading operation at the standby position of the image reading unit, a movement distance of the scanning unit for the output adjustment can be shortened, and the image reading operation can be performed at high speed.

Further, in the image reading apparatus according to the aspect of the invention, the control unit may perform at least one of a light intensity adjustment of the light source, acquisition of white level data, and acquisition of black level data so as to perform the output adjustment of the image reading unit about the first reference member or the second reference member.

Accordingly, the light intensity adjustment of the light source can be performed with no influence by external light, or white level data and black level data can be acquired as reference data of shading correction.

Further, it is preferable that the image reading unit be a contact image sensor.

Further, in the image reading apparatus according to the aspect of the invention, the open/closed state detecting unit may detect external light entering into the document placing table so as to detect the open/closed state of the document placing member.

The detection of external light can be performed by the image reading unit. Therefore, a sensor for detecting the open/closed state of the document pressing member does not need to be separately provided, and thus the reduction in size and cost can be realized.

Further, it is preferable that, if a light intensity adjustment value obtained through the light intensity adjustment about the first reference member by the image reading unit is less than a predetermined threshold value, the open/closed state detecting unit detect that the document pressing member is in the open state.

Further, it is preferable that, if a read value when the image reading unit turns off the light source and reads the first reference member is a predetermined threshold value or more, the open/closed state detecting unit detect that the document pressing member is in the open state.

Further, it is preferable that the first reference member have white and black portions provided in a row in a movement direction of the scanning unit, and, if a difference between read values when the image reading unit turns off the light source and reads the white and black portions of the first reference member is a predetermined threshold value or more, the open/closed state detecting unit detect that the document pressing member is in the open state.

What is claimed is:

1. An image reading apparatus comprising:
   a document placing table having a transparent member on which a document is placed;
   a document pressing member that is openably provided on the document placing table and covers the transparent member;
   an image reading unit that irradiates light from a light source onto the document and reads an image on the document based on reflected light;
   a scanning unit that is disposed on a side opposite to a document placing surface of the transparent member and reciprocates in a predetermined direction along the transparent member with the image reading unit mounted thereon;
   an open/closed state detecting unit that detects open and closed states of the document pressing member;
   a control unit that controls an image reading operation of the image reading unit and a reciprocation movement of the scanning unit; and
   a reference member that serves as a luminance reference of the image reading unit,
   wherein, when the open/closed state detecting unit detects the open state of the document pressing member, the control unit set a predetermined light intensity set value to a light intensity value of light irradiated from the light source at the time of image reading.

2. The image reading apparatus according to claim 1, wherein the control unit uses a light intensity value set in advance as the light intensity set value.

3. The image reading apparatus according to claim 1, wherein, when the open/closed state detecting unit detects the closed state of the document pressing member, the control unit stores a light intensity adjustment value obtained by performing a light intensity adjustment of the light source of the image reading unit about the reference member, and sets the light intensity adjustment value as the light intensity set value.

4. The image reading apparatus according to claim 1, wherein the open/closed state detecting unit detects external light entering into the document placing table so as to detect the open or closed state of the document placing member.

5. The image reading apparatus according to claim 4, wherein, when the light intensity adjustment value obtained by causing the image reading unit to perform the light intensity adjustment about the reference member is out of a predetermined range, the open/closed state detecting unit detects that the document pressing member is in the open state.

6. The image reading apparatus according to claim 4, wherein, when the image reading unit turns off the light source and reads the reference member and a read value is out of a predetermined range, the open/closed state detecting unit detects that the document pressing member is in the open state.

7. The image reading apparatus according to claim 4, wherein the reference member has white and black portions in a movement direction of the scanning unit, and
   when a difference between read values when the image reading unit turns off the light source and reads the white and black portions of the reference member is a predetermined threshold value or more, the open/closed state detecting unit detects that the document pressing member is in the open state.

8. The image reading apparatus according to claim 1, wherein the control unit irradiates light from the light source onto the reference member and acquires a luminance reference of the image reading unit on the basis of a light intensity adjustment value obtained by causing the image reading unit to perform the light intensity adjustment of the light source about the reference member.

9. The image reading apparatus according to claim 1, wherein the reference member is disposed in a vicinity of a region where the transparent member is exposed as an outer surface of the document placing table.

10. The image reading apparatus according to claim 9, wherein the reference member is disposed between the transparent member and a dividing member that is disposed in the region where the transparent member is exposed as the outer surface of the document placing table and divides the region.

11. The image reading apparatus according to claim 10, wherein the dividing member divides the region where the transparent member is exposed as the outer surface of the document placing table into a conveyed document reading region where the image reading unit reads the image of the document being conveyed in a predetermined direction and a still document reading region where the image reading unit reads the image of the document placed on the transparent member.

12. The image reading apparatus according to claim 11, wherein the document pressing member is provided with an automatic document conveying mechanism that conveys the document loaded on a paper supply tray to the conveyed document reading region and discharges the document to a paper discharge tray, and
   on a surface of the dividing member close to the document pressing member, a guide surface which guides the document before reading to the conveyed document reading region is formed.

13. The image reading apparatus according to claim 1, wherein the image reading unit comprises a contact image sensor.

14. An image reading apparatus comprising:
   a document placing table having a transparent member on which a document is placed;
   a document pressing member that is openably provided on the document placing table and covers the transparent member;
   an image reading unit that irradiates light from a light source onto the document and reads an image on the document based on reflected light;
   a scanning unit that is disposed on a side opposite to a document placing surface of the transparent member and reciprocates in a predetermined direction along the transparent member with the image reading unit mounted thereon;

an open/closed state detecting unit that detects open and closed states of the document pressing member;

a control unit that controls an image reading operation of the image reading unit and a reciprocation movement of the scanning unit;

a first reference member that is disposed in a region where the transparent member is exposed as an outer surface of the document placing table and serves as a luminance reference of the image reading unit; and a second reference member that is disposed in a region other than the region where the transparent member is exposed as the outer surface of the document placing table and serves as a luminance reference of the image reading unit, wherein, when the open/closed state detecting unit detects the closed state of the document pressing member, the control unit moves the scanning unit to a position facing the first reference member, and performs an output adjustment of the image reading unit about the first reference member, and when the open/closed state detecting unit detects the open state of the document pressing member, the control unit moves the scanning unit to a position facing the second reference member, and performs an output adjustment of the image reading unit about the second reference member.

15. The image reading apparatus according to claim 14, wherein the first reference member is disposed between the transparent member and a dividing member that is disposed in the region where the transparent member is exposed as the outer surface of the document placing table and divides the region.

16. The image reading apparatus according to claim 15, wherein the dividing member divides the region where the transparent member is exposed as the outer surface of the document placing table into a conveyed document reading region where the image reading unit reads the image of the document being conveyed in a predetermined direction and a still document reading region where the image reading unit reads the image of the document placed on the transparent member.

17. The image reading apparatus according to claim 16, wherein the document pressing member is provided with an automatic document conveying mechanism that conveys the document loaded on a paper supply tray to the conveyed document reading region and discharges the document to a paper discharge tray, and on a surface of the dividing member close to the document pressing member, a guide surface which guides the document before reading to the conveyed document reading region is formed.

18. The image reading apparatus according to claim 14, wherein the second reference member is disposed on an inner surface side of the document placing table.

19. The image reading apparatus according to claim 14, wherein the second reference member is disposed in a vicinity of an end position of a movable range of the scanning unit.

20. The image reading apparatus according to claim 19, wherein the second reference member is disposed in the vicinity of the end position of the movable range close to the still document reading region.

21. The image reading apparatus according to claim 14, wherein the image reading unit sets the periphery of the first reference member as a standby position.

22. The image reading apparatus according to claim 14, wherein the control unit performs at least one of a light intensity adjustment of the light source, acquisition of white level data, and acquisition of black level data so as to perform the output adjustment of the image reading unit about the first reference member or the second reference member.

23. The image reading apparatus according to claim 14, wherein the image reading unit comprises a contact image sensor.

24. The image reading apparatus according to claim 14, wherein the open/closed state detecting unit detects external light entering into the document placing table so as to detect the open/closed state of the document placing member.

25. The image reading apparatus according to claim 24, wherein, when the image reading unit turns off the light source and reads the first reference member and a read value is a predetermined threshold value or more, the open/closed state detecting unit detects that the document pressing member is in the open state.

26. The image reading apparatus according to claim 24, wherein the first reference member has white and black portions provided in a row in a movement direction of the scanning unit, and when a difference between read values when the image reading unit turns off the light source and reads the white and black portions of the first reference member is a predetermined threshold value or more, the open/closed state detecting unit detects that the document pressing member is in the open state.

27. The image reading apparatus according to claim 24, wherein, when a light intensity adjustment value obtained through the light intensity adjustment about the first reference member by the image reading unit is less than a predetermined threshold value, the open/closed state detecting unit detects that the document pressing member is in the open state.

* * * * *